United States Patent
Cortés Cortés

(10) Patent No.: US 12,180,560 B2
(45) Date of Patent: Dec. 31, 2024

(54) SOLID-LIQUID-SOLID HYDROMETALLURGICAL METHOD FOR THE SOLUBILIZATION OF METALS FROM SULFIDE COPPER MINERALS AND/OR CONCENTRATES

(71) Applicant: NOVA MINERALIS S.A., Santiago (CL)

(72) Inventor: Rodrigo Andrés Cortés Cortés, Región Metropolitana (CL)

(73) Assignee: NOVA MINERALIS S.A., Region Metropolitana (CL)

( * ) Notice: Subject to any disclaimer, the term of this patent is extended or adjusted under 35 U.S.C. 154(b) by 705 days.

(21) Appl. No.: 17/292,585

(22) PCT Filed: Oct. 29, 2019

(86) PCT No.: PCT/IB2019/059258
§ 371 (c)(1),
(2) Date: May 10, 2021

(87) PCT Pub. No.: WO2020/099966
PCT Pub. Date: May 22, 2020

(65) Prior Publication Data
US 2022/0002838 A1 Jan. 6, 2022

(30) Foreign Application Priority Data
Nov. 14, 2018 (WO) .................. PCT/IB2018/058969

(51) Int. Cl.
C22B 15/00 (2006.01)
C22B 3/08 (2006.01)
C22B 3/10 (2006.01)

(52) U.S. Cl.
CPC ............ *C22B 15/0069* (2013.01); *C22B 3/08* (2013.01); *C22B 3/10* (2013.01); *C22B 15/0071* (2013.01)

(58) Field of Classification Search
CPC ......... C22B 15/0069; C22B 3/08; C22B 3/10; C22B 15/0071
See application file for complete search history.

(56) References Cited

U.S. PATENT DOCUMENTS

| 7,968,065 B2 * | 6/2011 | Harris | C22B 23/0461 |
| | | | 423/40 |
| 10,041,143 B2 * | 8/2018 | Rautenbach | C22B 15/0071 |
| 2017/0335428 A1 * | 11/2017 | Gutiérrez | C22B 3/44 |

* cited by examiner

*Primary Examiner* — Brian D Walck
*Assistant Examiner* — Nazmun Nahar Shams
(74) *Attorney, Agent, or Firm* — Morgan, Lewis & Bockius LLP

(57) ABSTRACT

The present invention relates to a solid-liquid-solid hydrometallurgical method in the presence of hydrated and/or non-hydrated salts in an oversaturation conditions, which is achieved by the intentional and repetitive application of drying and wetting steps, enhancing the chemical and physical phenomena on the mineral or concentrate, thus provoking the crystallization, recrystallization, and release of copper in a non-stoichiometric decomposition of the sulfide and its subsequent precipitation with chloride. The invention is made up of 3 steps called: (a) Wetting, (b) Drying and Oversaturation, (c) Washing and re-wetting, and these are conducted at temperatures ranging from 20-40° C. regardless of the redox potential with a minimum consumption of water and acid without requiring the addition of oxygen. The method allows diminishing the water and acid consumption, since the transformation of the sulfide can be carried out only in the presence of hydrated salts and/or the minimal addition of acid and water.

17 Claims, 9 Drawing Sheets

SOLID-LIQUID-SOLID HYDROMETALLURGICAL METHOD FOR THE SOLUBILIZATION OF METALS FROM SULFIDE COPPER MINERALS AND/OR CONCENTRATES

FIELD OF THE INVENTION

The present application refers to a Solid-Liquid-Solid hydrometallurgical method, which can both achieve, through the same method, the solubilization of minerals and concentrates, in the form of oxides, secondary and primary sulfides, mainly chalcopyrite, and obtain a desired metal.

BACKGROUND OF THE INVENTION

There has been a significant growth in the production and consumption of minerals in recent decades, mainly due to the fact that developing countries entered into the global market. Mineral resources and climate change are intimately related, not only because mining requires a large amount of energy and water, but also because the world cannot face the climate change without an adequate supply of raw materials to manufacture clean technologies (Alonso E. et al., 2012; Elshkaki A, et al., 2016). The mining industry is one of the industrial areas with high energy and water consumption; therefore, there is great concern about the energy and water requirements and the environmental impacts that can be generated in the future. The future availability of metals and other mineral products will depend on economic and market factors (prices of metals, supply and demand thereof), technological developments to improve extraction and on social and environmental pressures (Franks D. et al., 2014; Cochilco, 2017; Schipper B., et al., 2018).

The world production and demand for copper has significantly increased in the last 25 years, due to the increase in world population, economic growth and the transition of society towards sustainability (USGS, 2009). Copper is a widely used metal and is essential in several economic sectors, for example, such as, e.g., infrastructure, wiring, electric vehicles, electrical and electronic equipment and renewable energy (Elshkaki A, et al., 2018). However, its production involves a high energy and water consumption and therefore a great environmental impact, which will aggravate in the coming decades due to the projected increase of over 200% of copper demand by 2050 (Elshkaki A. et al., 2016; Kuipers K. et al., 2018). Recent studies on criticality and short-term risk assessment of mineral supply suggest that in the next two to three decades the copper industry will have a difficult time meeting world demand, and its substitutes are not readily available (Elshkaki A. et al., 2016; Meinert L. et al., 2016; Schipper B., et al., 2018). However, recycling this metal can help to meet the future demand to some extent.

Climate change has had an important impact on ecosystem changes and desertification; furthermore, it generates unexpected weather events, such as rain in areas with no rain, heat and cold waves in different parts of the world. The north of Chile, an area where the largest copper production in the country is concentrated, has been affected by rains, which have generated an important impact on copper production in the first three months of 2019, reducing the production thereof by 5.1% in comparison to 2018; they also generate serious damage to some mining operations, since some deposits were not designed to deal with heavy rains, thus causing a stoppage of mining operations, which according to COCHILCO resulted in losses of USD 300 million.

On the other hand, the concern is directed to the active and inactive tailings dams in the northern zone, as the increase in river flows of the Altiplano and heavy rains could cause the collapse of the dams, putting the population and the environment in risk.

Chalcopyrite is the most abundant primary sulfide of copper, and it represents about 70-80% of the world's copper reserves (Hall S. et al., 1973; Kaplun et al., 2011). This mineral is stable and the sulfide most refractory to hydrometallurgical processes. Furthermore, the formation of a passivating layer has been observed, when it is subjected to a variety of leaching agents, which complicate the dissolution thereof even more (Dreisinger., 2006; Veloso et al., 2016). Enargite is also a primary sulfide of copper and is mainly present in deposits in Peru and Chile, being of environmental concern due to the arsenic content thereof, which requires special concern in foundries. For this reason, most foundries penalize the arsenic content in concentrates. In addition, arsenic is considered the most dangerous inorganic pollutant, since it causes environmental and health emergencies in several areas of the world (Mandal B. et al., 2002).

The hydrometallurgical processes that have been developed to leach minerals and/or copper concentrates are based on solid-liquid, solid-liquid-gas or solid-liquid-gas-bacteria methods, where different reagents are used, which mainly act as oxidizing agents; said processes could be divided into: chlorinated processes, nitrates processes, sulfates processes, ammonia processes, iodides processes, bacterial processes, among others. However, regardless of the leaching agent used, it always takes place in aqueous medium with high concentrations of sulfuric acid and normally requires an oxidizing agent, ferric and/or cupric ion, in addition to the presence of oxygen and constant watering (Dutrizac, 1991; Habashi F, 1993; Domic E, 2001; Dreisinger, 2006; Senanayake, 2009; Kawashima et al., 2013; Waltling, 2014; Veloso et al., 2016). In the specific case of chalcopyritic concentrates and enargite, it can be added that most processes take place at temperatures above 80° C. (McDonald et al., 2007 a; Gupta, 2010; Waltling, 2014).

The first use of chloride ions in metallurgy goes back to the sixteenth century in a process to amalgamate silver. The next important process was in 1860 when cuprous chloride was used for the direct decomposition of silver sulfide, which can be considered as the beginning of the use of chloride in hydrometallurgy (Liddell, 1945). Since then, numerous investigations of chlorinated leaching have been developed for the dissolution of sulfide minerals and copper concentrates (Dutrizac, 1991). The developed processes were mainly based on solid-liquid and solid-liquid-gas method with the use of chloride with oxidizing agents, such as cupric chloride ($CuCl_2$) and ferric chloride ($FeCl_3$) due to the advantages related to the high solubility of copper and ferric ion, sulfur control, and economy of the process (Dutrizac y MacDonald, 1974; Dutrizac J., 1981; Dutrizac J., 1991; Habashi F, 1993; Havlik T. et al., 1995; Domic E, 2001; Dreisinger, 2006; Carneiro, 2007; Nicol et al., 2016).

During decades in the world's leading copper producer, mining activity has generated a significant decrease in freshwater levels in the northern part of the country, which resulted in complaints from local communities about the availability of water resources.

As a late response, the General Directorate of Water (DGA for Dirección General de Aguas) duplicated the prohibition zones throughout Chile, increasing the same from 30 to 70, and among said prohibition zones mining areas are located, which will complicate the freshwater extraction for mining companies. On the other hand, the water demand from mining companies is expected to increase in the future, due to the decrease in mineral laws, compelling more material to be processed to maintain production levels (Bloomberg, Feb. 21, 2019).

Mines such as BHP Escondida and Zaldívar of Antofagasta Minerals are clear and complex examples on the use of fresh water in the north of Chile, since they have to adjust their current extraction levels if they want to continue operating, since the water availability in the aquifer is not enough to maintain extraction levels. Zaldívar mine shall shut down their operations, if they do not renew their water license, since they do not have an alternative plan. On the contrary, Escondida mine inaugurated its desalination plant to extract seawater at 3,000 meters above sea level for its operations, and it ambitiously aspires to stop using fresh water by the year 2030 (Bloomberg, Feb. 21, 2019).

Water shortages in mining areas, such as northern Chile and southern Peru, have led mining operations to use seawater, either desalinating it or using it directly in the leaching process. The best water quality in mineral dissolution processes is not necessarily completely desalinated, since the presence of some ions—such as the chloride ion, can be used to benefit the dissolution of the mineral (Dixon, 2013; Cisternas et al., 2017). The use of seawater in copper mining in Chile has significantly increased from the year 2010 to 2015, and a triplication in the use of this resource is projected for the year 2029; despite this, the use of fresh water in the country's great mining will grow by 12% by 2029 (Cochilco, 2017). The leaching of copper sulfides with seawater is associated with the use of chloride in the oxidative solution of secondary sulfides, such as chalcocite and covellite. On the contrary, the use of chloride in the chalcopyrite dissolution has not been effective, due to slow kinetics and incomplete dissolution (Dreisinger, 2006; Al-Harahsheh et al., 2008; Nicol et al., 2016; Lundstrom M. et al., 2016; Velásquez Y. et al., 2018).

A third of the world's copper production is produced by Chile and a significant change in the structure of the final product of copper mining is projected. This projection indicates that hydrometallurgical participation will increase from 30.8% to 12% by 2027, whereas the production of concentrates will increase from 69.2% to 89.9% by 2027 (Cochilco, 2017). The unit water consumption for a concentrator plant in 2016 reached 0.5 ($m^3$ $ton^{-1}$ $min^{-1}$). However, in hydrometallurgy the consumption reached 0.1 ($m^3$ $ton^{-1}$ $min^{-1}$) which results in a significantly less water use in hydrometallurgical processes (Cochilco, 2017). The decrease in hydrometallurgical participation in the type of mineral extracted is due to the exhaustion of leachable resources, the appearance of refractory primary minerals (chalcopyrite), and therefore the closure of mining operations. Furthermore, the appearance of primary sulfides leads to the processing of the high-grade ore mainly by flotation, which will address to a generation of idle capacity in the hydrometallurgical facilities, since no cost-effective hydrometallurgical technology for the treatment of primary sulfides of low-grade copper has been reported at industrial level (Cochilco, 2017). On the other hand, the increase in the production of concentrates will lead to an increase in the environmental liabilities (tailings) and the processing capacity of the foundries.

Three main processes can be identified in copper foundries: smelting, conversion, and refining. In all these processes gases are generated, such as carbon dioxide ($CO_2$) and sulfur dioxide ($SO_2$), which—by not being recovered in the smelting process, are released into the environment provoking a great environmental impact and damage to the people's health.

In the year 2013, the Chilean State enacted Supreme Decree 28, which indicates the emission standard for copper foundries, in order to reduce emissions of sulfur dioxide ($SO_2$), arsenic (As), mercury (Hg) and its object is to protect the health of people and the environment. The decree establishes that the 7 existing foundries shall capture and fix more than 95% of the sulfur and arsenic of the weight that enters into the process, and said value is well below foundries in Europe and Asia, which are required to capture 99.9% of emissions. In the year 2018 four of the seven foundries existing in the country did not comply with said decree, mainly due to the high investment costs, adaptation of equipment and construction of sulfuric acid plants, all of them required to update the foundries and meet the regulations established for the new emission limits (Ramírez J., 2019, Minería Chilena).

DESCRIPTION OF THE PREVIOUS ART

Hydrometallurgy is a science and technology for the extraction of metals or materials by aqueous methods (Habashi F, 1993). In general, this discipline of extractive metallurgy is developed in three different and sequential physical-chemical steps, called selective dissolution or leaching, purification/concentration and precipitation (Domic, 2001). This well-established science has competed energetically with pyrometallurgical techniques, and in some cases has displaced such processes. In the last time with the depletion of high grade minerals and in the presence of abundant primary low-grade minerals, hydrometallurgy appears as a possible, economically viable option to treat low-grades primary minerals (Habashi, 2005). The selective dissolution of a solid by means of an aqueous solution has been applied in copper minerals in heaps, being a well-established and successful process for oxidized minerals and copper secondary sulfides, such as chalcocite and covellite. On the contrary, for primary sulfide—such as chalcopyrite, it is still a problem of great relevance for copper mining, both for minerals and concentrates (Dreisinger, 2006; Nicol et al, 2016; Liu et al., 2017; Velásquez Y. et al., 2018).

The chemical leaching of minerals is a heterogeneous phenomenon, where the reaction takes place at the interface between a solid and a liquid, involving solid-liquid, solid-liquid-gas, and solid-liquid-gas-bacteria phenomena (Habashi F., 1999; Domic E, 2001; Dixon and Petersen, 2003). In general terms, it can be said that the dissolution of a mineral in an aqueous medium is ruled by the diffusional steps (Wen C, 1968, Crest, A, 2000, Dixon and Petersen, 2003). On the contrary, heterogeneous reactions involving solid-gas and solid-solid phases at room temperature, without the intervention of a liquid phase, have an extremely slow reaction rate (Lefebvre R., 2001; Evans K., 2006).

Chalcopyrite ($CuFeS_2$), enargite ($Cu_3AsS_4$) and bornite ($Cu_5FeS_4$) are refractory and semiconducting, sulfide and primary copper minerals such as the vast majority of sulfide minerals with a crystalline structure, wherein the iron and copper ions are in tetrahedral coordination with sulfur in the case of chalcopyrite (Hall S. et al., 1973, Nikiforov K., 1999). Spectroscopic measurements of chalcopyrite and bornite have identified that the electronic structure of both minerals is the same for copper ($Cu^{1+}$) and iron ($Fe^{3+}$) with a molecular weight for the first one of 183.52 g/mol and for the second one of 501.8 g/mol, where each atom provides in its atomic weight the following percentages: Cu 34.6%; Fe 30.4%; S 34.9% and Cu 63.3%; Fe 11.1%; S 25.5%, respectively (Grguric B et al., 1998, Mikhlin et al., 2004, Pearce et al, 2006). Enargite ($Cu_3AsS_4$) is a copper sulfide with arsenic, like chalcopyrite and bornite has a +1 valence for copper; however, it has a molecular weight of 393.8 g/mol and each atom in its atomic weight is provided by the following percentages: Cu 48.4%; As 19.0%; S 32.6% (Li D. et al., 1994, Arribas J. 1995, www.mindat.org).

The low kinetics of copper extraction from primary sulfides—by oxidative and/or reductive conditions in the presence of low and high concentrations of chloride, has generated a large amount of research work, in order to mainly understand the oxidative dissolution of this mineral, and these works are summarized in these publications (Debernardi and Carlesi, 2013, Kawashima et al., 2013). On the other hand, it is suggested that the use of chloride in the chalcopyrite solution has several challenges to face in order to be implemented in a heap leaching process. One of said challenges is to achieve the regeneration of oxidizing agents such as cupric ion and ferric ion, and also to control pH, redox potential and passivation. The latter is suggested to be generated by the formation of different compounds, such as disulfide dichloride ($S_2Cl_2$), elemental sulfur, non-stoichiometric secondary sulfides and chlorocuprate I complexes, which are absorbed by the mineral surface (Lu et al., 2000; Carneiro, 2007; Lundström et al., 2016; Nicol, 2017; Liu et al., 2017).

Copper ions can form complexes with chloride ions and the prevalence of the complex will depend on the chloride concentration and the leaching environment. In solutions with high chloride concentration there is a prevalence of cuprous complexes $[CuCl_2]^-$, $[CuCl_3]^{-2}$, $[Cu_2Cl_4]^{-2}$, $[Cu_3Cl_6]^{-3}$, over the copper complexes $[CuCl]^+$, $[CuCl_2]^0$, $[CuCl_3]^-$, $[CuCl_4]^{2-}$, whose solubility decreases as the concentration of chloride increases. On the contrary, the chlorocuprate (I) complexes increase their solubility as the chloride concentration increases (Berger and Winand, 1983, Fritz, 1980, 1981, Lin et al., 1991, Winand., 1991; Yoo et al., 2010). The beneficial effect of chlorocuprate I complexes in the solution of chalcopyrite has not been extensively studied, and they are considered as dissolution inhibitors; therefore, it is sought to maximize the presence of copper ions as an oxidizing agent over chlorocuprate I complexes (Winand., 1991; Liu et al., 2017).

The use of chloride in the dissolution of chalcopyrite in an oxidative medium has been applied using saturated and unsaturated chloride solutions. It was observed that, on the one hand, at low and high concentrations of chloride the passivation of the mineral could be avoided, due to the low REDOX potentials achieved under these conditions (Velásquez et al., 2010; 2018). On the contrary, the use of concentrated solutions of chloride and acid allows a better dissolution of primary sulfide by means of long period of curing and pre-treatment of the mineral, which is then subjected to a leaching process at low or high REDOX potential (Patiño et al., 2014; Velásquez Y. et al., 2018). Recent studies by Velásquez (Velásquez Y. et al., 2018) show that the increase in curing periods helps to solubilize primary sulfides; however, the process generates an incomplete dissolution of chalcopyrite. On the contrary, at temperatures of 50° C. the solubilization of a chalcopyritic concentrate in a flooded medium (reactor) increases by over 85%. On the other hand, recent studies derived from the results of Patiño show that the solubilization of a chalcopyritic concentrate with concentrated chloride solutions in an oxidizing medium only achieved a copper extraction of 19% (Lundstrom M. et al., 2016). In addition, it is suggested that chalcopyrite is oxidized to covellite, which is different from the suggestion of Pihlaso et al. (2008), who mentions the chalcocite formation. The use of high concentrations of a reagent can generate an increase in the reaction rate; however, it could also generate unwanted side reactions, and be economically non-viable (Habashi F., 1999); furthermore, it becomes economically unfeasible by having to constantly transport large quantities of salts to the operation in order to keep a constant supply. On the other hand, some works propose that chalcopyrite could be reduced by cuprous ions in an aqueous medium with acetonitrile and/or chloride at high temperatures, reducing chalcopyrite to chalcocite or bornite (Avraamides et al., 1980, Winand, 1991).

Furthermore, according to thermodynamic studies, it is suggested that chlorocuprate I complexes in a chlorinated medium increase the critical potential, which would generate an increase in the copper extraction from the chalcopyrite, following the model suggested by Hiroyoshi (Yoo et al., 2010). However, there is a limited amount of thermodynamic studies in concentrated chloride solutions, which makes this a nearly unexplored field (Fritz, 1980, 1981; Winand, 1991; Yoo et al., 2010).

During the process of mechanical preparation of the mineral the generation of fine particles takes place, which can affect the permeability of the heap. Agglomeration is a step that is generally carried out before leaching into oxide heaps and secondary sulfides, and it consists of joining fine particles to coarser ones, in order to increase the permeability coefficient in the heap and thus being able to have conditions of efficient watering and aeration to improve the extraction process (Bouffard S C, 2005, 2008).

Consequently, the process of agglomeration is crucial to maintain a good hydrodynamic of the heap and to avoid the formation of a pool therefrom. The simplest agglomeration step is carried out through the addition of water and acid, in order to moisten the mineral until an optimal surface tension is achieved. Therefore, the presence of water in the agglomeration step is of vital importance, since without the presence of water there are no agglomerates and neither an adequate distribution of the acid, which would cause an inefficient curing (Domic E., 2001; Lu. J. et al., 2017). On the other hand, during this step the curing of the mineral is also carried out by the addition of concentrated sulfuric acid, so that it acts on all the mineral particles and generates the best conditions for the leaching process. The acidity both in the curing step and in the leaching solutions is very important, since it interacts with the mineral and with the gangue, so that the lack of acid could harm the extraction of the copper (Bouffard S. C., 2005; Lu J. et al., 2017). The mechanism and equipment of agglomeration and curing can be conducted by adding water and then acid on the mineral on a conveyor belt or by using an agglomerating drum that allows a wet particle to rotate around itself, thus allowing efficient formation of the agglomerate (Domic E., 2001).

Weathering is defined as the partial or total fragmentation or degradation of rocks and minerals upon contacting atmospheric agents. The natural weathering of rocks or minerals is carried out by chemical reactions (chemical weathering) and various processes of mechanical disintegration (physical weathering) such as thermal stress, increase in volume of clay minerals and crystal growth in rock diaclases due to phase changes. The relevant changes provoked by solutions in rock pores are called solvent crystallization and correspond to a freezing crystallization process; however, when the process is generated by a solute, it is called salt weathering or haloclasty, and in both cases there is an increase in the pressure on the inner walls of the rock, which promotes the wear or tear thereof (Wellman H et al., 1965; Goudies A. et al., 1997; Smith J., 2006). Physical weathering by salts affects porous materials, such as rocky outcrops and minerals. The chemical species (anions and cations) are transported by aqueous solutions, which can be introduced into the minerals by their pores and/or diaclases. The concentration of the salts in solution will vary during the circulation through the mineral or the rock, which can be generated due to the following conditions: chemical interaction with the mineral, water evaporation, temperature variations and relative humidity variations. The increase of the concentration of a salt by water evaporation and under given environmental conditions will generate the precipitation thereof that will take place when the concentration of the salt is such that the product of solubility is equal to or greater than the equilibrium constant. When the product of solubility is equal to the equilibrium constant, the condition is balanced and the solution is called saturated, whereas when the product of solubility is greater than the equilibrium constant, the condition is unbalanced and the solution is called supersaturated (Grossi C M et al., 1994; Desarnaud J. et al., 2016).

Chemical weathering and salt weathering represent different mechanisms of rock breakage and generally operate conjointly. However, it is difficult to differentiate their effects separately, since they are interrelated phenomena, since the products that can be generated by mineral dissolution are used for a new salt weathering process. An example thereof is the generation of sulfates, which can be produced by the attack of sulfuric acid, which can be of volcanic origin, deposition of atmospheric sulfur dioxide or by the own reactions of the dissolution of a rock. Sodium chloride and hydrated magnesium chloride are abundant salts present in nature that have an active role as antifreeze agents and road pollution controllers.

Inorganic chloride was born from the dissolution of hydracidic compounds and binary salts in aqueous media under certain homogeneous solubility conditions. The intermolecular forces of the solvent (for example, water) cause the total destruction of ionic and covalent bonds allowing the dissociation of salts in their primitive polar ions, i.e., a metal or non-metallic metal valent cation ($H^+$, $Na^+$, $Mg^{2+}$, $Fe^{3+}$, $K^+$, etc.) and the involved chloride anion. Bischofite is a hydrated salt, whose chemical formula is $MgCl_2 \times 6H_2O$, being magnesium chloride the active compound thereof, which has various physical properties, such as deliquescence, the ability to increase the surface tension of water and vapor pressure. This salt is obtained as residue or waste from the solar evaporation process to which the brines extracted from certain salt flats are subjected, mainly in the lithium triangle, made up by Chile, Argentina and Bolivia, and it is necessary for the extraction of lithium and potassium. Hydrated magnesium chloride or bischofite crystals is available worldwide. However, bischofite produced in Chile has the advantage of having a low level of impurities. The main use of bischofite is oriented to the stabilization of roads; however, there are no restrictions on the production capacity of this salt, since the main producing companies have abundant deposits of bischofite, which increase every year with a production that far exceeds the demand thereof. For example, in the year 2015 the sale of bischofite was close to 150,000 tonnes, which corresponds to less than 10% of the total amount produced by the companies during that year, and the same occurred during the following years (Fiscalía Nacional Económica [National Economic Prosecutor's Office], 2017) showing that the supply greatly exceeds the demand and that there is an opportunity to use this salt.

Sodium and magnesium chloride salts are soluble salts with a tendency to oversaturation, they are very mobile in solution and can penetrate deeply into fractures or diaclases of rocks, thus provoking efflorescence and crystallization of salts on the surface or inside the mineral or rock, as special features of these two salts. The location of soluble salts with respect to the outer surface of a mineral depends on the mechanism of saturation or oversaturation of the solution. In case this is generated by an evaporation process, the mechanism will be controlled by two processes that act simultaneously: on the one hand, the rate of evaporation, and on the other hand, the rate of solution deposition through the mineral. If the vapor diffusion rate is less than the rate of solution migration, the latter can reach the external surface, where the salts will evaporate and crystallize; this depends on the form of heat transfer, either by convection or radiation (Gómez-Heras et al., 2016).

This last phenomenon is called efflorescence. On the contrary, if the solution migration rate is lower than the water vapor diffusion rate, the equilibrium will be achieved at a certain distance from the surface, producing cryptoefflorescence. When the water vapor diffusion rates are higher, they will generate a greater precipitation of salts, which will enhance said phenomenon. The crystallization inside the fractured mineral due to the evaporation of aqueous dissolutions will produce the growth of chloride crystals, which will generate pressures and loss of cohesion of the mineral (Winkler, 1973, Amoroso et al., 1983, Lewin, 1989, Desarnaud J. et al., 2016). The variations of temperature and relative humidity of the air in contact with the precipitated salts induce processes of dilution and precipitation of salts. However, these processes are accompanied by phenomena of hydration and dehydration, which lead to phase transitions, generating an increase in the size of the crystals of soluble salts, and therefore the fragmentation of the rock, i.e., a phenomenon called haloclasty (Gupta et al., 2014; Desarnaud J. et al., 2016). The evaporation of a liquid in a porous medium involves complex phenomena of liquid and vapor transport, and phase changes. However, both the determination of the evaporation rate as well as the evolution of the distribution of the liquid within the porous space, as the liquid phase is replaced by the gaseous phase, are important for the oversaturation condition and for predicting damage induced by the crystallization of salts. The slow evaporation processes are well known and can be exemplified by the process of water evaporation from a solid at room temperature. In this case the evaporation rates are very small, so the temperature variations due to the phase change are insignificant (Prat M. et al., 2007). In the case of use of saturated sodium chloride solutions, efflorescence is an important factor, since the crystallization process occurs mainly on the surface of the solid, which significantly decreases the evaporation kinetics, due to the blockage of the surface of the solid by efflorescence (Sghaier N. et al., 2009), causing low physical damage inside the mineral.

The REDOX potential is an important parameter in the methods and in most technologies proposed for the dissolution of the chalcopyrite, since it has been suggested that the formation of leaching products, considered as passivating agents, depends on the potential of the medium, where lower potential are favored by a higher copper extraction, whereas higher potential are favored by a lower copper extraction (Elsherief, 2002; Hiroyoshi et al., 2001; Velásquez-Yévenes et al., 2010; 2018). However, the potential window, at which these higher copper extractions are achieved, is limited and difficult to control, which means that once the critical dissolution potential is exceeded, the extraction of the chalcopyrite stops completely or an incomplete extraction is achieved, due to the leaching products, which block the surface of the mineral, avoiding the dissolution thereof (Dixon & Petersen, 2006; Li et al., 2010; Ahmadi et al., 2010; Kaplun et al., 2011; Nicol, 2017; Liu et al., 2017).

The studies of the phenomena and mechanisms of the chalcopyrite dissolution have been directed to the type of leaching agents, dissolution parameters, redox potential, curing times, pre-treatments and to the passivation phenomenon. On the contrary, the role of the aqueous medium on the surface of the mineral has not been extensively studied, considering that acid and water are the most abundant chemical species in hydrometallurgical processes. On the other hand, Oliveira C. et al. and Ferreira de Lima et al. (2011) studied the adsorption of water on the surface of chalcopyrite at a molecular level and found the formation of sulfur dimers and hydrophobic zones. These findings are suggested by the authors as a possible response to the low kinetics of dissolution of chalcopyrite in aqueous media.

The publication US20040060395 (Hamalainen, 2004) discloses a solid-liquid-gas oxidative process and is related to a process that uses a chlorinated environment for the leaching of concentrates by the action of cupric chloride in the presence of oxygen at elevated temperatures.

The publication U.S. Pat. No. 7,491,372 (Faine, 2005) reveals a solid-liquid-gas oxidative process, and is related to a process using calcium chloride, in order to improve the quality of the agglomerates and thus the permeability of a heap. In addition, the phenomenology of the process is based on favoring the generation of oxidizing agents ($Fe^{3+}$ and $Cu^{2+}$) by the action of oxygen and the redox duo of copper and iron, which causes the solubilization of sulfide minerals.

The publication WO2007134343 (Muller et al, 2007) refers to a hydrometallurgical method composed of two steps: the first one related to a non-oxidative step in an acid medium, and a second one corresponding to an oxidative step involving solid-liquid-gas interaction. This is intended for the recovery of copper from primary and secondary minerals, which comprises leaching the material in an acid solution with chloride at redox potentials inferior to 600 mV in the presence of dissolved oxygen and cupric ions as oxidizing agents.

The publication WO2016026062 (Patiño et al., 2016) discloses a solid-liquid oxidative process that involves the addition of oxidizing agent and a pretreatment of the mineral in the presence of high concentrations of chloride and minimum presence of oxygen, with redox potential superior to 700 mV for the solubilization of copper primary and secondary sulfides.

The publication WO2016026062 (Álvarez, 2016) discloses a chemical and bacterial process in a solid-liquid-gas medium, and is related to a process of leaching secondary and primary copper sulfides in a chloride-ferric-ferrous medium, with iron-oxidizing bacteria and archaea adapted to high concentrations of chloride ions. In addition, it involves the injection of hot air to raise the temperature and enhance the mineral dissolution reactions.

The publication WO2016179718 (Engdahl et al., 2017) refers to a solid-liquid-gas oxidative method carried out in a three-phase-mixture agglomeration drum, and to a mineral agglomeration process carried out inside said drum for the pretreatment of minerals in the presence of sodium chloride, both used in hydrometallurgy mainly. Said drum and method use a system and a recirculation step of chlorine gas as part of the invention.

The U.S. Pat. No. 7,749,302 (Hyvärinen et al., 2006) refers to the HydroCopper™ technology, developed by Outokumpu, which consists of an oxidative method in a solid-liquid-gas medium for the leaching of copper concentrates in high concentrations of copper chloride and sodium chloride, with the help of oxygen and at temperatures between 85-95° C.

Chalcopyrite dissolution has been extensively studied, both by chemical and biotechnological processes during the last 60 years (Watling H. R., 2013, Li Y. et al., 2013, Liu et al., 2017), wherein a lot of pathways and dissolution mechanisms in the presence of different salts and oxidizing agents have been suggested, but they always depend on the solid-liquid, solid-liquid-gas, solid-liquid-gas-bacteria method or pre-treatment steps with long periods of curing and watering-resting. On the other hand, the conditions traditionally used in leaching correspond to unsaturated solutions and dependent on parameters such as redox potential, pH and presence of oxidizing or reducing agents. Finally, all the industrially-applied leaching methods from the 50s until today have been effective for a type of mineral, such as oxidized minerals (acidic medium), secondary sulfides (medium of sulfate and chloride) or primary sulfides, but it has not been possible to implement a transversal and unique method capable of solubilizing both oxides and secondary and primary sulfides.

The present invention differs from the state of the art in the fact that the former relates to a Solid-Liquid-Solid (S-L-S) hydrometallurgical method that is capable of achieving the solubilization of oxidized minerals, secondary and primary sulfides, primary sulfides mainly, such as chalcopyrite, under the same S-L-S method, without depending on parameters such as redox potential, oxygen and acid concentration. On the other hand, the method of the present application is not pretreatment or a prolonged step of curing and watering-resting, but it is a continuous solid-liquid-solid method in a condition of oversaturation of non-hydrated and/or hydrated chloride salts, such as sodium chloride and/or bischofite, a condition that is generated by the intentional and repetitive application of drying steps, wetting and rewetting steps, enhancing chemical and physical phenomena on the mineral or concentrates, thus causing crystallization, recrystallization and release of copper and its subsequent precipitation with chlorine in a non-stoichiometric decomposition of primary or secondary sulfide. The method takes place at temperatures of 20-40° C. with minimum or no consumption of water and acid, and there is no need to add oxidizing or reducing agents and oxygen. This entire process takes place independent of the presence of common impurities such as arsenic, since the decomposition of the mineral or concentrate occurs in a non-stoichiometric ratio. Furthermore, from the environmental point of view the method of the present application has the hydrometallurgy benefits along with reducing the consumption of acid and water, since the sulfide transformation can be executed only in the presence of water and/or with the minimum addition of acid. In addition, this method makes it possible to reduce the use of water in the agglomerate and/or agglomerate-curing step, since when a salt of hydrated chloride (for example bischofite) is mixed with the mineral, the water molecules of said hydrated salt moisturize the mineral, reducing the volume of water that shall be added in the agglomerate and/or curing steps.

On the other hand, the present invention would make resources available to reserves, which would supply the future copper demand, would re-activate the hydrometallurgical plants and change the projections of the final copper product in the next decade, thus decreasing the use of flotation, which generates a great environmental impact, due to the high consumption of energy and water further to the generation of environmental and polluting liabilities due to the operation of the foundries.

SUMMARY OF THE INVENTION

The present invention relates to a Solid-Liquid-Solid (S-L-S) hydrometallurgical method in the presence of non-hydrated and/or hydrated chloride salts, such as, e.g., sodium chloride and/or bischofite in a condition of oversaturation, which is achieved by the intentional and repetitive application of drying steps, wetting and rewetting steps, enhancing chemical and physical phenomena on the mineral or concentrates, thus causing the crystallization, recrystallization and release of copper in a non-stoichiometric decomposition of the sulfide and subsequent precipitation thereof with chloride. The method takes place at temperatures of 20-40° C., independent of the redox potential, with a minimum consumption of water and acid, without requiring the addition of oxygen. The method allows reducing the consumption of acid and water, since the sulfide transformation can be carried out only in the presence of hydrated salts and/or the minimum addition of acid and water. In addition, this method makes it possible to reduce the use of water in the agglomerate and/or agglomerate-curing step, since when a salt of hydrated chloride is mixed with the mineral, the water molecules of said hydrated salt (for example bischofite) moisturize the mineral, reducing the volume of water that shall be added in the agglomerate and/or curing steps.

The present invention relates to a Solid-Liquid-Solid method in a chlorinated medium, ruled by physical and chemical weathering processes for the solubilization of sulfide minerals, by oversaturation and crystallization of salts, using the addition of: a) a salt of non-hydrated chloride, or b) a salt of hydrated chloride, or c) a mixture of both salts, in a condition of oversaturation, which is achieved by repetitive and intentional drying steps, which promotes rapid evaporation kinetics, and consequently the solubilization of the mineral, particularly chalcopyrite. This method is composed of 3 steps, called "Wetting Step", "Drying and Oversaturation Step", and "Washing and Re-wetting Step". These steps can be repeated as many times as necessary to achieve maximum solubilization of the primary and/or secondary copper sulfide, either in the mineral or concentrate, thus achieving greater extraction of the desired metal.

These three overlapped or sequential steps are ruled by Solid-Liquid-Solid chemical and physical phenomena that do not depend on the redox potential and they are conducted in a wide range of pH. For this purpose, non-hydrated and/or hydrated chloride salts are used, resulting in oversaturation and crystallization of salts and as a consequence the selective and non-stoichiometric solubilization of copper sulfide of primary and/or secondary origin.

The first step, called Wetting, corresponds to a step of wetting the mineral with water or water and acid, in the presence of salts in a non-oxidative, non-agglomeration-reducing condition, but always in the presence of: a) a salt of non-hydrated chloride, or b) a salt of hydrated chloride, or c) a mixture of both salts. At this step water may or may not be added, since in the case of salt of hydrated chloride it is sufficient with the wetting provided by the water molecules of said salt, when mixed with the mineral, without the addition of water or adding a minimum dose; however, in case of using a non-hydrated chloride salt (for example, sodium chloride) the addition of a solution is required, the addition of liquid at this step generates the salt solvation process, which allows the activation of ions to react and migrate through the mineral diaclases. All these conditions generate variable conditions of pH and minimum presence of oxygen, thus creating optimal conditions for the second step of the process.

The second step, called Drying and Oversaturation Step, corresponds to a Drying process promoting the salt oversaturation, crystallization, recrystallization, and precipitation, both in the inside as in the outside of the mineral or concentrate. Drying can begin on the conveyor belt and continue on the heap or be carried out directly on the heap, by injecting hot or dry air, increasing the temperature and/or promoting low relative humidity. At this step, physical and chemical weathering is promoted, which is generated by the use of chloride salts in an oversaturation condition. On the other hand, the dissolution of the primary and/or secondary copper sulfide, chalcopyrite mainly, is ruled by a oversaturation and precipitation condition, which causes a non-stoichiometric decomposition of the sulfide, therefore, the process does not depend on the redox potential, pH, presence of oxygen or reducing or oxidizing agents. The drying time is variable and concludes with the beginning of the step of washing the mineral or concentrate.

The third step, called Washing and Re-wetting Step, corresponds to a washing step, wherein an acidulated solution or an acidulated unsaturated solution of sodium chloride is added to remove chlorinated soluble species from the target metal (e.g., copper) generated in the second step; furthermore, it restores the chloride and moisture concentrations in the mineral. Once the washing is finished, a new Drying and Oversaturation Step begins, wherein the mineral is dried again to promote salt evaporation and oversaturation for periods of varying times. The wash can be an acid-chlorinated one and/or simply seawater and is oriented to remove the precipitated copper in the second process step.

The repetitive application of the steps of Wetting, Drying and Rewetting enhances the condition of oversaturation and the phenomena of salts crystallization, enhancing physical damage to the mineral or concentrate.

The reactions and mechanisms involved in the steps of the method of the present application can take place in any sulfide mineral that contains copper, iron, sulfur and arsenic, even in smaller amounts, being obvious that they will develop their effect on the dissolution of any other base metal, such as metallic sulfide. This applies to minerals containing nickel, zinc, cobalt, molybdenum, etc.

DETAILED DESCRIPTION OF THE INVENTION

Figure 1:
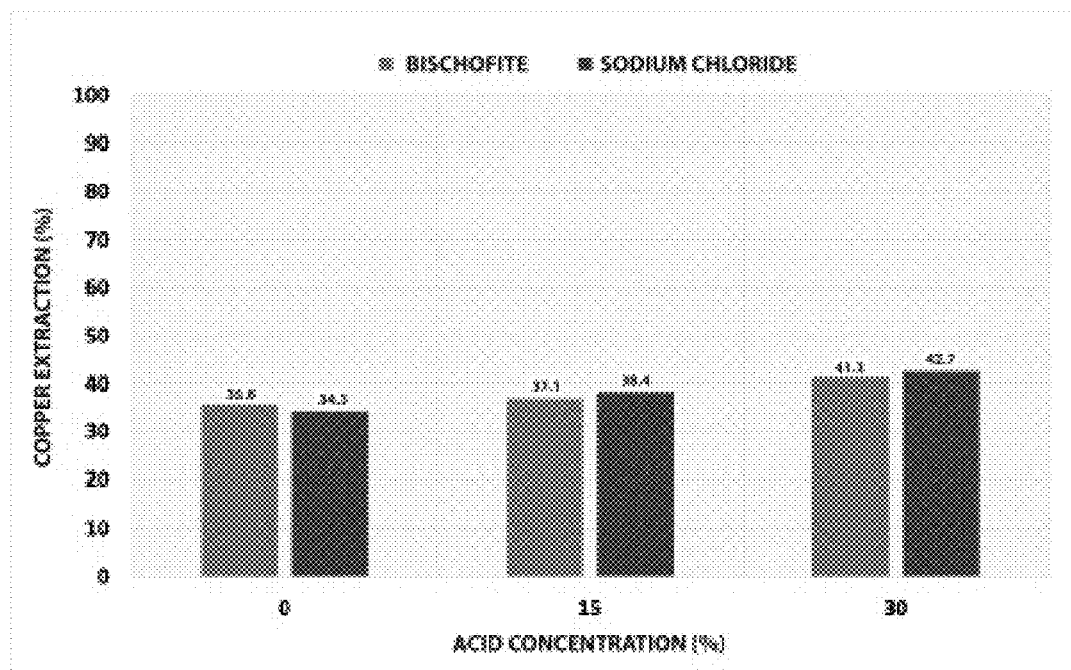
FIG. 1: copper-extraction chart in relation to the concentration of acid in the Wetting step using Mineral 1.

The present invention relates to a Solid-Liquid-Solid (S-L-S) hydrometallurgical method in the presence of non-hydrated and/or hydrated chloride salts, in a condition of oversaturation, which is achieved by the intentional and repetitive application of drying and wetting steps, enhancing chemical and physical phenomena on the mineral or concentrates, thus causing the crystallization, recrystallization and release of copper in a non-stoichiometric decomposition of the sulfide and subsequent precipitation thereof with chloride. The method takes place at temperatures of 20-40° C., independent of the redox potential, with a minimum consumption of water and acid, without requiring the addition of oxygen. The method allows reducing the consumption of acid and water, since the sulfide transformation can be carried out only in the presence of hydrated salts and/or the minimum addition of acid and water. In addition, the method of the present application allows reducing the use of water in the agglomerate and/or agglomerate-curing step, since when a hydrated salt is mixed with the mineral, the water molecules of the salt of hydrated chloride moisturize the mineral, reducing the volume of water that shall be added in the agglomerate and/or curing steps.

The present invention relates to a Solid-Liquid-Solid method in a chlorinated medium, ruled by physical and chemical weathering processes for the solubilization of sulfide minerals, by oversaturation and crystallization of salts, using the addition of: a) a salt of non-hydrated chloride, or b) a salt of hydrated chloride, or c) a mixture of both salts, in a condition of oversaturation, which is achieved by repetitive and intentional drying steps, which promotes rapid evaporation kinetics and then the salts oversaturation, encouraging the solubilization of the sulfide minerals, particularly chalcopyrite. This method is composed of 3 steps, called "Wetting Step", "Drying and Oversaturation Step", and "Washing and Re-wetting Step". These steps can be repeated as many times as necessary to achieve maximum solubilization of the primary and/or secondary copper sulfide, either in the mineral or concentrate, thus achieving greater extraction of the desired metal.

To carry out the Solid-Liquid-Solid hydrometallurgical method of the present invention a non-hydrated chloride salt can be used, which is selected from the group consisting of sodium chloride, potassium chloride, magnesium chloride, anhydrous ferrous chloride, anhydrous ferric chloride, and calcium chloride, and the hydrated chloride salt is selected from the group consisting of hexahydrated magnesium chloride (bischofite), heptahydrated ferrous chloride, hexahydrated ferric chloride, among others.

These three overlapped or sequential steps are ruled by Solid-Liquid-Solid chemical and physical phenomena that do not depend on the redox potential and they are conducted in a wide range of pH. For this purpose, non-hydrated and/or hydrated chloride salts are used, resulting in oversaturation and crystallization of salts and, as a consequence, the selective and non-stoichiometric solubilization of copper sulfide of primary and/or secondary origin.

The process for copper minerals comprises the following, detailed steps:

I. Wetting Step

This step begins with the exposure of the crushed mineral to an agglomerating step or an agglomerating and curing step in an agglomerating drum or on a conveyor belt, in order to moisten, form agglomerates and dissolve sodium chloride or bischofite, using conventional methods and processes. This step can be carried out in the following manners:

The first manner corresponds to the addition of water and acid conjointly. On the contrary, acid and water are separately added in a classic agglomerating and curing process.

The second manner corresponds to the addition of bischofite and/or sodium chloride in solid form, depending on the own features of the mineral and the concentration of salts required for the mineral dissolution, which ranges between 20 and 80 kg/t.

The third manner corresponds to the fact that this step may be carried out using the addition of bischofite only, without adding water and acid, which would allow the salt to be added directly to the conveyor belt.

The third manner corresponds to the fact that this step may be carried out using the addition of a mixture of salts and water or water and acid; in case of using water only, the curing step would not be executed.

In relation to a continuous regime, circulating or recirculation solutions will be used for the wetting and/or agglomerating-curing process, further to the replacement of the concentration of salts that were retained in the tails of the treated mineral. The reinstatement of bischofite and/or sodium chloride will be conducted by the addition in solid of 5 to 15 kg/t, depending on the chloride content in the process recirculation solution. The addition of fresh and/or circulating sulfuric acid ranges from 0 to 30 kg/t of mineral with a final moisture of the agglomerated mineral that varies between 8 and 15%, depending on the features of the gangue, hygroscopicity and granulometry of the mineral. In this wetting step only bischofite and/or sodium chloride, water or acid and water are required. Neither the addition of cupric ions is required, nor the addition of oxygen. Once the mineral is wetted, agglomerated and/or cured, it is transported to the stacking fields and after the mineral is part of the heap the Wetting step finishes and the second step of Drying and Oversaturation begins.

Conditions of the Wetting Step:
  a) Bischofite concentrations between 20 and 80 kg/t.
  b) Sodium chloride concentrations between 20 and 80 kg/t.
  c) Mixture of both salts, between 20 and 80 kg/t
  d) Target moisture between 6 and 15%.
  e) Acid concentration between 0 and 30 kg/t.

II. Drying and Oversaturation Step

This second step takes place in a solid-liquid-solid (S-L-S) condition and consists in promoting oversaturation of salts by drying the mineral by vaporization and/or evaporation methods, which includes injection of dry and/or hot air, temperature or low relative humidity. This step can begin on the conveyor belt by partially decreasing the surface moisture of the mineral and/or directly on the pile, by using some of the drying methods that allow generating and enhancing a constant drying kinetics while promoting oversaturation and the physical phenomena in the mineral, such as crystallization, precipitation and haloclasty. During this step there is no addition of solutions (watering) and the heap is covered or a lid is put thereon during each drying cycle, which ranges from 15 to 90 days, in order to increase the temperature and evaporation, avoid salts drag-out caused by wind, and protect the heaps from rain, snow or low temperatures. The first cycle of the method finishes when copper extraction decreases significantly, since the vaporization or evaporation kinetics stops, as the surface of the mineral is covered by precipitated copper-chloride complexes and salt crystals, since in the case of sodium chloride the crystallization process is carried out on the surface of the solid mainly. As soon as the first cycle finished, the first wash begins, so as to remove the extracted copper. As soon as the first wash finishes, a second cycle of drying and oversaturation begins, so as to achieve maximum oversaturation and copper extraction.

In this step only bischofite and/or sodium chloride, water or acid and water are required. The addition of oxidizing agents such as cupric ions is neither required, nor the addition of oxygen by constant irrigation. This step of Drying and Oversaturation finishes when the continuous or intermittent watering of variable duration begins, using an acid and unsaturated solution of bischofite and/or sodium chloride.

Drying and Oversaturation Conditions:
  a) Sodium chloride concentrations between 20 and 80 kg/t.
  b) Bischofite concentrations between 20 and 80 kg/t.
  c) Drying time of 15 to 90 days or more, depending on the reactivity of the surface of the mineral or concentrate.
  d) Moisture between 6 and 10%.
  e) Temperature of from 20 to 35° C.

III. Step of Washing and Re-Wetting

As soon as the drying period ends, the third step of Washing and Re-wetting is began by watering with an unsaturated acid solution of chloride. The objective of the Washing is to remove copper and soluble species, reinstate salts, clean the surface of the mineral and re-wet the bed. As soon as the step of Washing and Re-wetting finishes, a second drying cycle is started.

Washing and Re-Wetting Conditions:
  a) Bischofite concentrations between 120 and 200 g/L.
  b) Sodium chloride concentrations between 120 and 200 g/L.
  c) Concentration of sodium chloride and bischofite of from 120 to 200 g/L.
  d) Net watering rate of from 5-10 L/h/m$^2$.
  e) pH of the solution, 0.5 to 6.

The three steps of Wetting, Drying and Oversaturation, and Washing can be repeated as many times as necessary, as long as wetting and chloride concentrations may be promoted again, so as to achieve maximum solubilization of the copper contained in the primary or secondary mineral.

Process for Solubilization of Concentrates

The process for concentrates comprises the following, detailed steps:

I. Wetting Step

This step begins with the mixture of the concentrate with bischofite and/or sodium chloride; thereafter, water, or water and acid are added, in order to achieve optimum wetting of the concentrate and solvation. The concentration of bischofite and/or sodium chloride used ranges from 20 to 120 kg/t in a solid-liquid-solid condition. However, the concentration of fresh and/or circulating sulfuric acid will be necessary to achieve a pH between 0.5 and 3. The final moisture varies between 8 to 20%, depending on the own features of hygroscopicity of the salt and concentrate.

In this step only bischofite and/or sodium chloride, water or acid and water are required to wet the concentrate. Neither the presence of oxidizing agents is required, nor the presence of temperature or oxygen. On the other hand, in the case of concentrates having necessary moisten for the process, only sodium chloride and/or bischofite shall be added in solid.

As soon as the concentrate is mixed with salts and optimum moisture has been imposed, which corresponds to the maximum moisture that the concentrate can stand before forming a paste, it is transported to concentrate accumulation fields to begin with the second step of Drying and Oversaturation.

Wetting Conditions (Solid-Liquid-Solid):
  a) Sodium chloride and/or bischofite concentrations between 20 and 120 kg/t.
  b) Moisture between 9 and 20%.
  c) pH of from 0.5 to 7.
  d) Particle size: 100% under 150 microns.

II. Drying and Oversaturation Step

This second step of Drying and Oversaturation consists in drying the wetted concentrate for a variable time, so as to generate the condition of chloride oversaturation and the Selective Transformation of the concentrate to soluble, chlorinated, copper species and precipitation of the soluble species. On the other hand, as the drying period increases, the moisture decreases and the oversaturation condition is enhanced, due to the water evaporation and/or vaporization. In addition, the prolonged drying period promotes the crystallization of salts and the phenomenon of cryptoefflorescence in the particles of the concentrate.

The Drying process of the concentrate is carried out in greenhouses that have temperatures ranging from 25 to 40° C., promoting low relative humidity, which allows having constant evaporation kinetics in the heaps or heaps of concentrates, to promote copper oversaturation and extraction.

In this step only bischofite and/or sodium chloride, water or acid and water are required. The addition of oxidizing agents such as cupric ions is neither required, nor the addition of oxygen. This Step of Drying and Oversaturation finishes when the concentrate is transferred to washing tanks, to remove the extracted copper.

Drying and Oversaturation Conditions (Solid-Liquid-Solid):
a) Bischofite and Sodium Chloride in oversaturation.
b) Drying time of 15 to 90 days or more, depending on the reactivity of the surface of the concentrate.
c) Moisture between 8 and 15%.
d) Temperature of from 25 to 40° C.
e) Acid pH.

III. Step of Washing and Re-Wetting

The concentrate that was subjected to the Drying and Oversaturation step is transported to a washing tank, where the concentrate is subjected to a Washing step with an acidulated solution or chloride and acid, to obtain the soluble copper. Subsequently the concentrate is filtered and dried, in order to start a new process cycle if the total copper extraction is insufficient. The copper-rich solution, obtained by washing the concentrate, is sent to a solvent extraction plant and subsequently to an electrowinning plant. However, the solution can also pass directly to the new electrowinning plants, which can generate a cathode without a previous solvent extraction step and treat the copper-rich solutions directly.

Chlorinated Washing Conditions:
a) Sodium chloride and/or bischofite concentrations between 0 and 200 g/L.
b) pH of from 0.5 to 3.
c) Washing time between 2 to 45 minutes.

The steps of (1) Wetting, (2) Drying and Oversaturation, and (3) Washing can be repeated as many times as necessary, as long as wetting may be promoted in the presence of chloride again, so as to achieve maximum solubilization of the copper contained in the concentrate.

EMBODIMENTS OF THE INVENTION

The present invention specifically relates to a Solid-Liquid-Solid hydrometallurgical method for the solubilization of metals from minerals and/or concentrates of sulfide minerals of primary and/or secondary origin containing them, wherein said method comprises the following sequential and/or overlapped steps:

I. Wetting, wherein the mineral or concentrate is wetted by the addition of water or water-acid and hydrated and/or non-hydrated chloride salts;
II. Drying and Oversaturation, wherein the wetted mineral is dried by vaporization and/or evaporation, and said drying may be carried out both in the heap as in the conveyor belt, generating oversaturation conditions, crystallization and recrystallization of salts, thus enhancing chemical and physical weathering on the mineral or concentrate, the acid concentration, and
III. Washing and Re-wetting, wherein an acidulated solution with or without chloride is added to remove the target metal species precipitated in the second step of the process, also allowing the mineral or concentrate to be re-wetted in order to restore the optimum concentration of chloride and moisture to the bed.

Wherein, when the method is in continuous regime, the contact of the mineral or concentrate in step I is executed with recirculating solutions of the same process that may contain chloride, iron and copper ions, in an unsaturated environment, and wherein the three steps are carried out independently of the REDOX potential of the medium.

In a preferred embodiment of the invention, the hydrated salt of chloride is selected from the group consisting of hexahydrated magnesium chloride (bischofite), heptahydrated ferrous chloride, hexahydrated ferric chloride, among others.

In another preferred embodiment, the non-hydrated chloride salt is selected from the group consisting of sodium chloride, potassium chloride, magnesium chloride, anhydrous ferrous chloride, anhydrous ferric chloride, and calcium chloride, among others.

In an embodiment of the invention, the hydrated and/or non-hydrated chloride salt in step I is sodium chloride and/or bischofite, which is added in solid or in solution, preferably in an amount of from 20 to 80 kg per tonne of material, preferably between 30 and 60 kg/t.

In another embodiment of the inventions, steps I and II can be executed only with the addition of bischofite and/or bischofite and water and/or process solutions.

In another embodiment of the invention, the addition of chloride salts in step I, II, and III may include a mixture of hydrated and/or non-hydrated salts.

In another preferred embodiment of the method, the addition of water and acid in step I is carried out separately or conjointly, preferably conjointly. Wherein the addition of sulfuric acid ranges from 0 to 30 kg per tonne of material, preferably between 5 and 15 kg/t.

In a preferred embodiment of the invention, the final moisture of the agglomerated mineral in step I may range between 6 and 20%, preferably between 8 and 10%.

In another embodiment of the invention, step I may be executed in an agglomerating drum or on the conveyor belt directly.

In a preferred embodiment, the mineral drying in step II is performed a heap covered and protected, so as to generate a temperature increase.

In an even more preferred embodiment of the invention, the condition of oversaturation of species and salts in step II is achieved by intentional and repetitive drying cycles and/or by drying the mineral by air injection and/or temperature increase and/or by periods without adding solutions, wherein the heap can be covered or a lid may be put thereon during drying cycles in step II.

In another embodiment of the method, the concentrations of salts to be replenished in the continuous regime system in step I range between 5 and 20 kg/t.

In a preferred embodiment, steps I, II and III of the method can be repeated one or more successive times until the greatest extraction of the desired metal is achieved.

In another embodiment of the invention, after step I the minerals and/or sulfide mineral concentrates are subjected to drying cycles ranging from 15 to 90 days, wherein the oversaturation condition is generated and crystallization of salts and precipitation of soluble species of chlorinated metal take place.

In a preferred embodiment of the method, the sulfide mineral that can be of primary origin, chalcopyrite mainly, is subjected to 2 or 3 drying cycles ranging from 30 to 90 days, preferably 60-day cycles.

In another preferred embodiment, after step 1 the sulfide mineral that can be of secondary origin, chalcosine and covellite mainly, is subjected to 2 or 3 drying cycles ranging from 15 to 45 days, preferably 15-day cycles.

In one embodiment of the method, the mineral in step III is washed by continuous or intermittent watering with a solution containing acidulated water, or acid and chloride.

In a preferred embodiment of the invention, the metals to be solubilized are selected from the group including copper, zinc, nickel, molybdenum, cobalt, lead, among others.

In another embodiment of the invention, in step III a washing is performed by means of a limited or prolonged watering, promoting the presence of Cu (I) or Cu (II), respectively.

In one embodiment of the method, the solubilization of the target metal can be carried out from sulfide minerals with arsenical contents as well as from concentrates of sulfide minerals with arsenical contents comprising the same.

In another preferred embodiment, steps I, II and III can be applied to copper minerals and/or concentrates, preferably chalcopyrite, bornite, tennantite, enargite, chalcocite and covellite.

In a preferred embodiment of the invention, step II can be applied in a drying chamber or greenhouse, which allows generating constant evaporation kinetics of the liquid.

In another preferred embodiment of the invention, chloride ions can be added into the method in the form of bischofite, sodium chloride, potassium chloride, magnesium chloride, ferrous chloride, ferric chloride, calcium chloride or through the use of recirculation solutions of the same method containing chloride ions, iron and copper.

In another preferred embodiment, the metal to be solubilized is copper and the sulfide mineral is a copper sulfide secondary mineral.

In a preferred embodiment of the invention, step II is performed in a solid-liquid-solid condition.

In a preferred embodiment of the method, step I of wetting and step II of drying and oversaturation may be performed using a pH of from 0.5 to 5.

In another embodiment of the invention, step I of wetting, step II of drying and oversaturation, and step III of washing may be performed regardless of the potential, below 700 mV or above 700 mV (Eh).

In a preferred embodiment of the invention, step III of washing maybe performed using a reused solution in the presence of chloride and iron ions.

In an even more preferred embodiment, steps I and II may use chloride salts, which may come from seawater, brines from desalination plants, halite, bischofite and commercial sodium chloride.

In another embodiment of the invention, steps I, II, and III may be performed at room temperature, preferable of from 20-40° C.

In an even more preferred embodiment of the invention, the solution obtained from step II may follow the traditional steps of solvent extraction and electrowinning or go to electrowinning directly.

EXAMPLES OF USE

Example 1: Mineralogy of Three Copper Minerals

Table 1 shows the quantitative mineralogical analysis obtained for four head samples of copper sulfide minerals, called as Mineral 1, 2, 3, and 4. For the analysis, optical optic microscopy was used as well as modal analysis, supported by sequential copper chemical analysis. To determine the mineralogical composition the statistical method of point counting was used. The mineralogical analysis by total copper indicated that there were minerals of low and high grade; however, the analysis by copper species showed that the percentage of chalcopyrite is 99.8%, 81.7%, 45%, and 11.7%, respectively, for Minerals 1, 2, 3, and 4.

TABLE 1 quantitative mineralogical analysis obtained for four head samples of copper sulfide minerals, called as Mineral 1, 2, 3, and 4

| Species | Mineral 1 % | Mineral 2 % | Mineral 3 % | Mineral 4 % |
|---|---|---|---|---|
| Total copper grade | 0.24 | 0.68 | 0.36 | 0.67 |
| Chalcopyrite | 99.8 | 81.7 | 45 | 11.7 |
| Bornite | 0.13 | 12.3 | — | 12.0 |
| Tennantite | 0.08 | 1 | — | 0.1 |
| Chalcocite | — | 3.9 | 21 | 76.2 |
| Covellite | — | 1.1 | 14 | — |
| Atacamite | — | — | 4 | — |
| Malachite | — | — | 16 | — |

Example 2: Copper Extraction in Relation to the Concentration of Acid in the Wetting Step Using Mineral 1

The results of FIG. 1 were obtained from column tests, using Mineral 1, which has a total copper grade of 0.24% and a chalcopyrite percentage of 99.8% by copper species (see Table 1).

Mineral 1 was subjected to a traditional crushing process until achieving a particle size of 100% under ½ inch. Subsequently, six loads of said mineral were prepared, and then subjected to the Wetting step, wherein agglomeration and agglomeration-curing were performed by adding water, and water and acid together. The direct addition of bischofite and sodium chloride in solid form on the mineral was performed using the following concentrations and conditions:

a) Addition of 60 kg/t of sodium chloride.
b) Addition of 60 kg/t of bischofite.
c) Addition of 0.15 and 30 kg/t of sulfuric acid.
d) 10% Moisture.
e) Temperature of 30° C.

As soon as the Wetting step concluded, the thermal Drying step began in the column directly, for a period of 45 days. As soon as the time determined for the second step was completed, the third step of Washing was started, with a watering rate of 5 L/h/m$^2$ for 12 hours, using a sodium chloride solution of 180 g/L (pH 1).

The results can be seen in FIG. 1, wherein it can be observed that the increase in the acid concentration in the Wetting step does not involve a crucial effect on the copper extraction during the Drying and Oversaturation step. Furthermore, the test that was performed in the presence of water only confirms that the method does not depend on the acid concentration and, therefore, neither on curing, which differs from the state of the art, since the method of the present application depends on the concentration of salts and evaporation kinetics.

Example 3: Copper Extraction in Relation to the Percentage of Moisture in the Wetting Step Using Mineral 1

Figure 2:
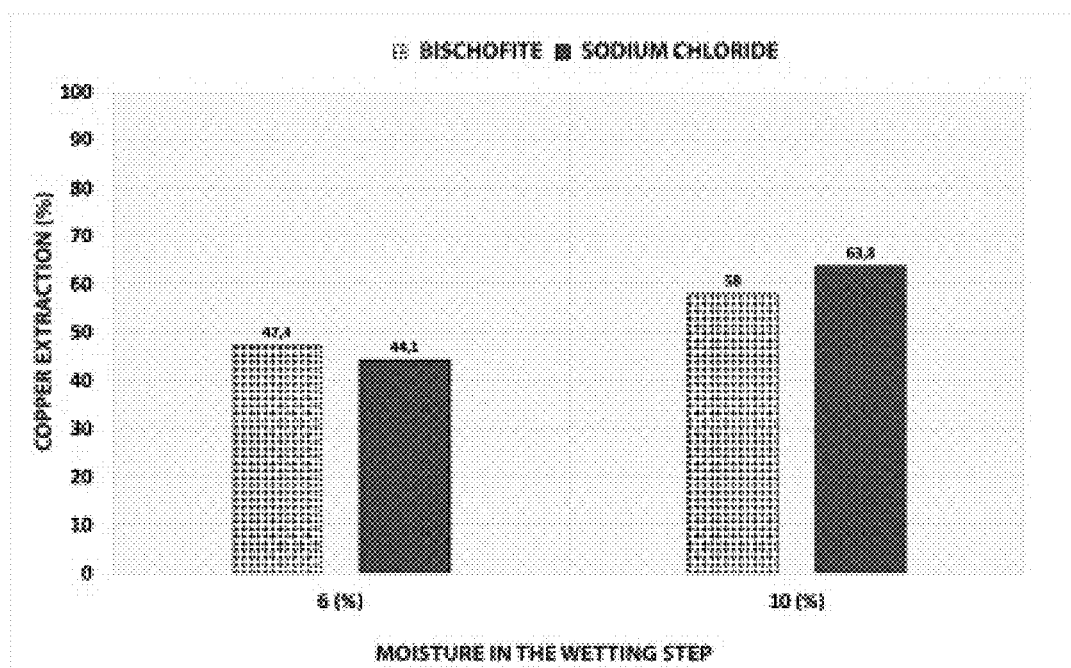
FIG. 2: copper-extraction chart in relation to the percentage of moisture in the Wetting step using Mineral 1.

The results of FIG. 2 were obtained in column tests using Mineral 1. Minerals were subjected to a traditional crushing process until achieving a particle size of 100% under ½ inch. Subsequently, four loads of said mineral were prepared. Then, each mineral load was agglomerated and cured by adding water, and water and acid together, which resulted in different moisture for each test. The direct addition of bischofite and sodium chloride in solid form on the mineral was performed using the following concentrations and conditions:

a) Moisture percentage: 6 and 10%.
b) Addition of 15 kg/t of sulfuric acid.
c) Addition of 60 kg/t of bischofite.
Addition of 60 kg/t of sodium chloride.
e) Drying and Oversaturation time: 60 days.
f) Temperature of 30° C.

As soon as the time determined for the second step was completed, the third step of Washing was started, with a watering rate of 5 L/h/m2 for 24 hours, using an artificial raffinate solution containing 180 g/L sodium chloride, 5 g/L ferric chloride, 2 g/L ferrous chloride, and 10 g/L of acid.

The results are shown in FIG. 2, wherein it can be observed that the moisture percentage imposed in the Wetting step for those tests with sodium chloride has an important effect on the performance of the step of Drying and Oversaturation, this achieving greater extraction of copper with 10% moisture. Nevertheless, those tests using bischofite shown a smaller difference, due to the deliquescence of this salt probably, which is not the case of sodium chloride.

Example 4: Copper Extraction in Relation to the Salt Concentration Using Mineral 1

Figure 3:
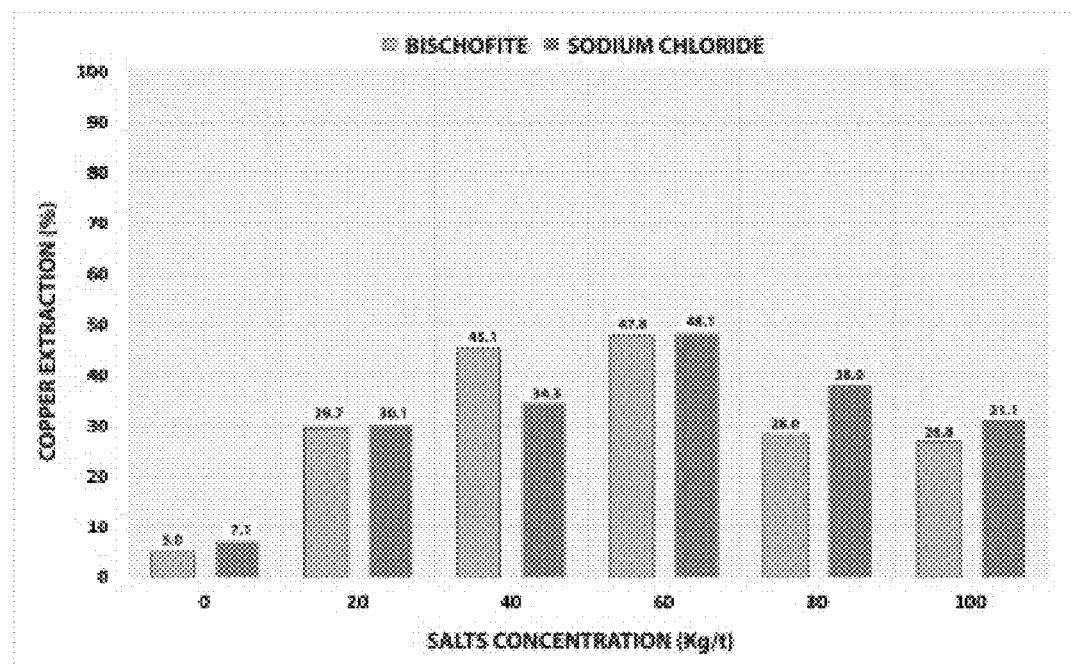
FIG. 3: copper-extraction chart in relation to the salt concentration using Mineral 1.

The results of FIG. 3 were obtained in column test using Mineral 1.

The mineral was subjected to a traditional crushing process until achieving a particle size 100% under ½ inch. Subsequently, twelve charges of said mineral were prepared, and then subjected to the Wetting step, by adding water, and water acid together. The direct addition of bischofite and sodium chloride in solid form on the mineral was performed using the following concentrations and conditions:

a) 0, 20, 40, 60, 80 kg/t NaCl.
b) 0, 20, 40, 60, 80 kg/t bischofite.
c) Acid addition: 15 kg/t.
d) 10% Moisture.
e) Temperature of from 25-30° C.

As soon as the Wetting step concluded, the Drying and Oversaturation step began during a 45-day period, wherein no watering was present, and columns were covered so as to maintain temperatures of from 25-30° C. As soon as the second step was completed, the third step of Washing was started, with a watering rate of 7 L/h/m² for 12 hours, using an artificial raffinate solution containing 180 g/L sodium chloride, 5 g/L ferric chloride, 2 g/L ferrous chloride, and 10 g/L of acid.

The results are shown in FIG. 3, wherein one can observe an increase in the salts concentration, which generates a greater copper extraction. However, this phenomenon or tendency for both salts is just maintained until 60 kg/t, possibly due to the fact that excess salts cause the oversaturation of the mineral surface rapidly, allowing minimum evaporation kinetics. In the case of bischofite the results show that only 40 kg/t are required to achieve high copper extraction; however, 60 kg/t are needed for sodium chloride. It seems that the use of hydrated salts has a better performance than the non-hydrated ones in the Solid-Liquid-Solid method.

Example 5: Copper Extraction in Relation to the Drying Time in the Drying and Oversaturation Step Using Mineral 1

Figure 4:
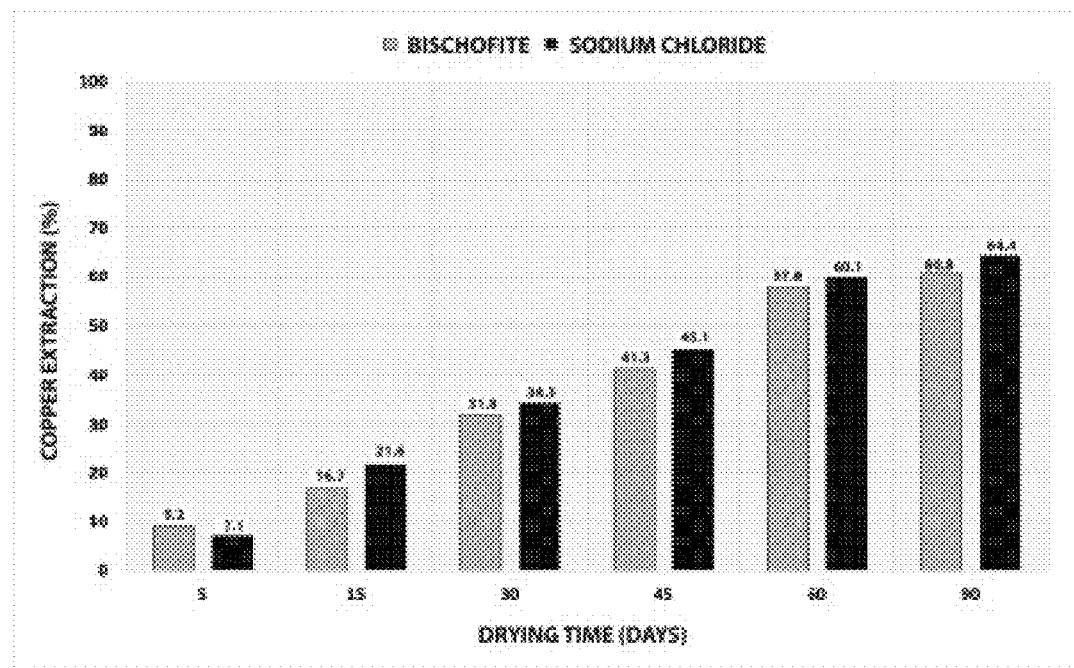
FIG. 4: copper-extraction chart in relation to the drying time in the Drying and Oversaturation step, using Mineral 1.

The results of FIG. 4 were obtained in column test using Mineral 1.

Minerals were subjected to a traditional crushing process until achieving a particle size 100% under ½ inch. Subsequently, twelve charges of Mineral 1 were prepared, and then subjected to the Wetting step, wherein agglomeration and curing were performed by adding water and acid together. The direct addition of bischofite and sodium chloride in solid form on the mineral was performed using the following concentrations and conditions:

a) Addition of 60 kg/t NaCl.
b) Addition of 60 kg/t bischofite.
c) Acid addition: 15 kg/t.
d) 10% Moisture.
e) Temperature of from 25-30° C.

As soon as the Wetting step concluded, the Drying and Oversaturation step began for different periods of time (5, 15, 30, 45, 60, and 90 days). As soon as the period of time determined for the second step was completed, the third step of Washing was started, with a watering rate of 5 L/h/m² for 24 hours, using an artificial raffinate solution containing 180 g/L sodium chloride, 5 g/L ferric chloride, 2 g/L ferrous chloride, and 10 g/L of acid.

The results are shown in FIG. 4, wherein an increase in the copper extraction can be observed as the Drying and Oversaturation time increases, which confirm that the Solid-Liquid-Solid method is ruled by the evaporation kinetics that allows an oversaturation and a high ionic charge, which finally allows the extraction of copper.

Example 6: Copper Extraction in Relation to the Simulation of a Continuous Regime Using Mineral 1

Figure 5:
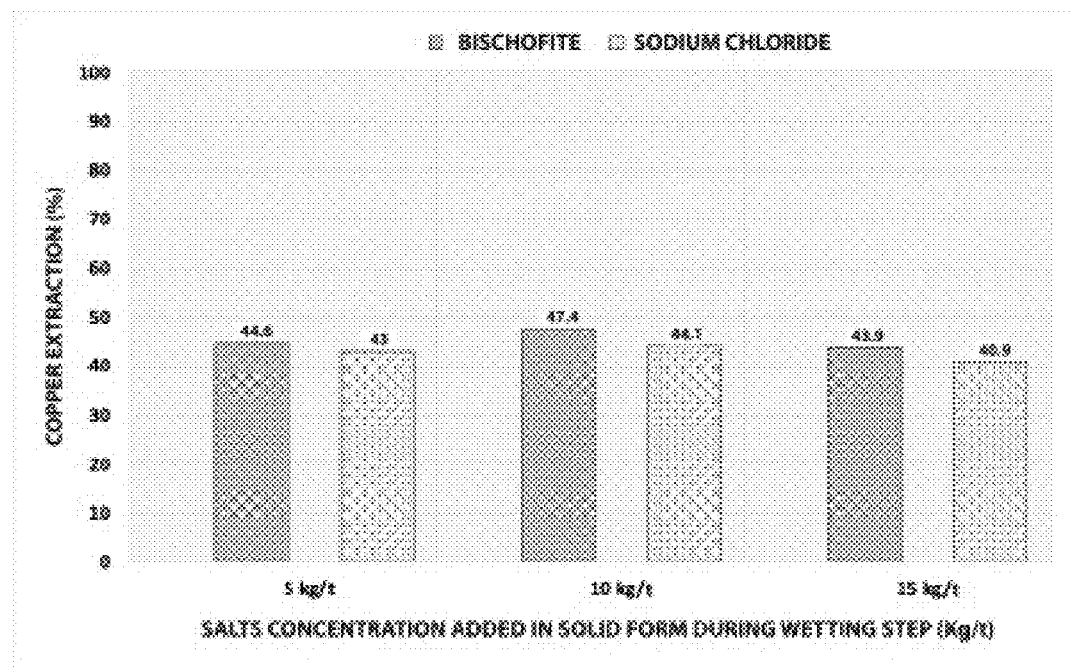
FIG. 5: copper-extraction chart in relation to the simulation of a continuous regime, using Mineral 1.

The results of FIG. 5 were obtained in column test using Mineral 1.

Minerals were subjected to a traditional crushing process until achieving a particle size 100% under ½ inch. Subsequently, six charges of Mineral 1 were prepared, and then subjected to the Wetting step, wherein the simulation of a continuous regime was performed by carrying out the agglomeration and curing process with addition of water and acid together, as well as the addition of an artificial raffinate, where the chloride was in solution. The direct addition of bischofite and sodium chloride in solid form on the mineral was performed using the following concentrations and conditions:

a) Addition of 5, 10 and 15 kg/t NaCl.
b) Addition of 5, 10 and 15 kg/t bischofite.
c) Artificial raffinate: 80-120 g/L sodium chloride, 5 g/L ferric chloride, 2 g/L ferrous chloride, and 10 g/L of acid.
d) 10% Moisture.
e) Temperature of from 25-30° C.
f) Drying time: 45 days.

As soon as the second step was completed, the third step of Washing was started, with a watering rate of 7 L/h/m² for 12 hours, using an artificial raffinate solution containing 180 g/L sodium chloride, 5 g/L ferric chloride, 2 g/L ferrous chloride, and 10 g/L of acid.

The results are shown in FIG. 5, wherein one can observe that the effect of adding the salts in solution and in solid is effective, achieving extractions similar to the ones obtained when the salts are added in solid on the mineral. Results prove that the reinstatement of salts in a continuous regime can be performed by adding 5, 10 or 15 kg/t salts. This test indicates that the Solid-Liquid-Solid method is feasible to be applied in a mining operation, since the amount of salts to be reinstated in the circuit is technically and economically viable.

Example 7: Copper Extraction in Relation to the First Cycle of the Solid-Liquid-Solid Method Versus Prolonged Curing Times Using Mineral 1

Figure 6:
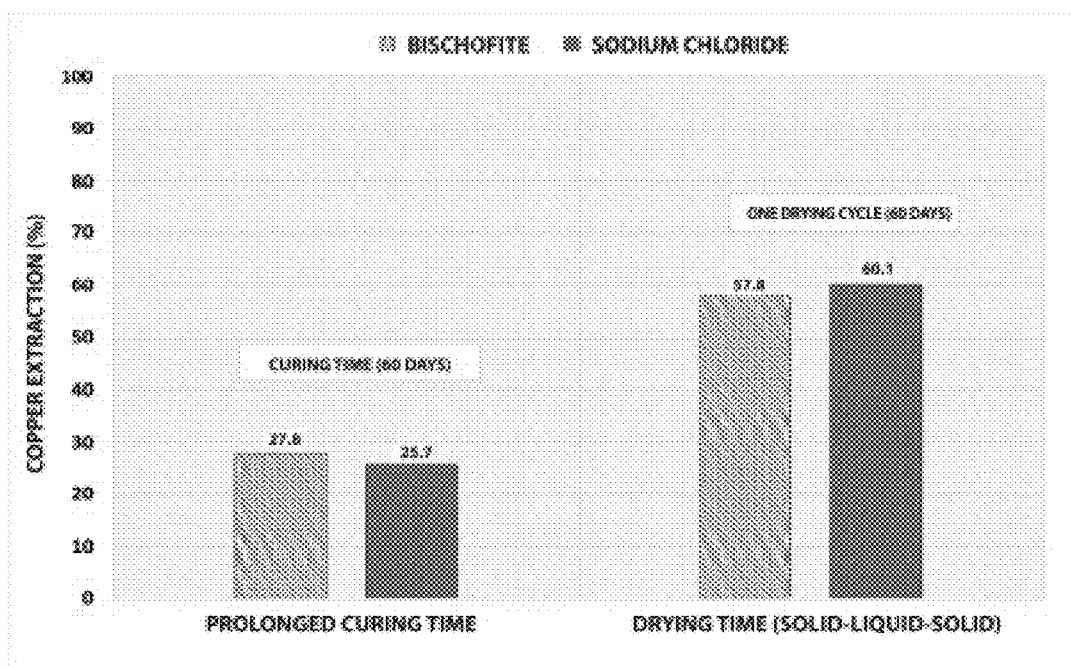
FIG. 6: copper-extraction chart in relation to the first cycle of the Solid-Liquid-Solid method versus Prolonged Curing Times, using Mineral 1.

The results of FIG. 6 were obtained in column test using Mineral 1.

Minerals were subjected to a traditional crushing process until achieving a particle size 100% under ½ inch. Subsequently, six charges of said mineral were prepared, and then subjected to the Wetting step, executing the agglomeration and curing process by adding water and acid together for the S-L-S method, whereas water and acid were added separately for the prolonged curing test.

The four prolonged-curing tests corresponded to loads, i.e., 2 loads for a 60-day curing and two loads for a 120-day curing as shown in Example 8. The direct addition of bischofite and sodium chloride in solid form on the mineral was executed using the following concentrations and conditions:

Solid-Liquid-Solid Method (Cycle No. 1)
a) Addition of 60 kg/t NaCl.
b) Addition of 40 kg/t bischofite.
c) 10% Moisture.
d) Acid: 15 kg/t.
e) Thermal drying: 25-30° C.
f) Drying time: 60 days.

Prolonged Curing Time
a) Addition of 60 kg/t NaCl.
b) Addition of 60 kg/t bischofite.
c) 10% Moisture.
d) Acid: 40 kg/t.
e) Room temperature without drying.
f) Curing time: 60 days.

As soon as the second step and the prolonged curing time were completed, the third step of Washing was started for those tests including 60 days of testing, with a watering rate of 7 L/h/m² for 12 hours, using an artificial raffinate solution containing 180 g/L sodium chloride, 5 g/L ferric chloride, 2 g/L ferrous chloride, and 10 g/L of acid.

The results are shown in FIG. 6, wherein one can observe that the S-L-S method is capable of obtaining an extraction far superior to a prolonged curing process, although acid concentration higher than the one used in the method were employed. Furthermore, the same concentrations of salts as the solid-liquid-solid method were considered; however, the extraction amount more than doubled the one from a prolonged curing process.

Example 8: Copper Extraction in Relation to Two Cycles of the Solid-Liquid-Solid Method Versus Prolonged Curing Times of 120 Days Using Mineral 1

Figure 7:
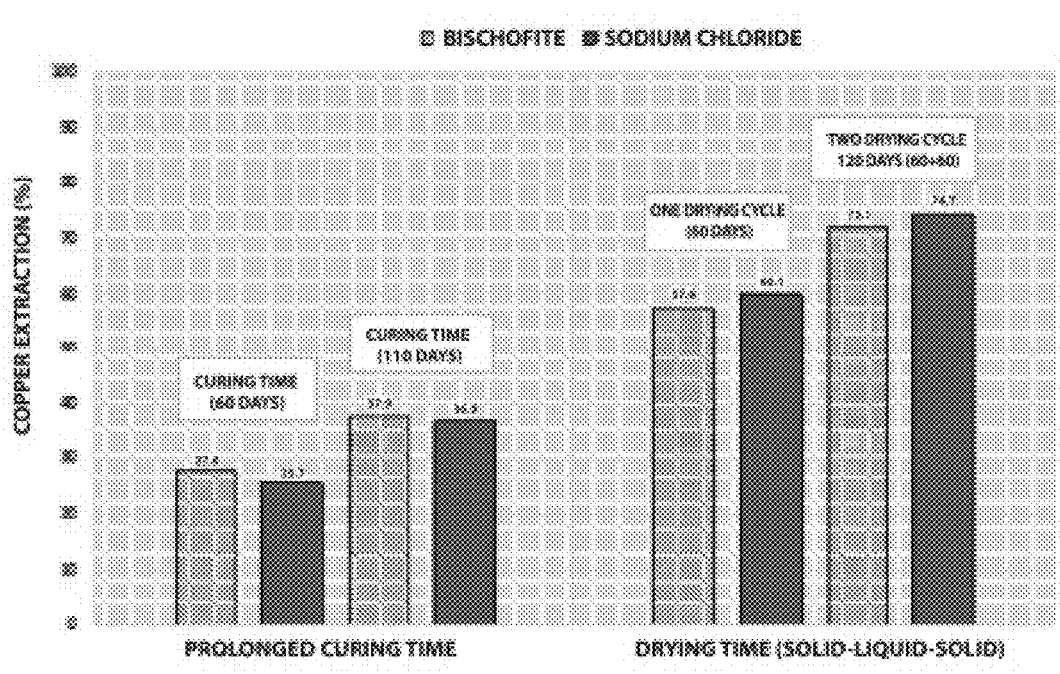
FIG. 7: copper-extraction chart in relation to two cycles of the Solid-Liquid-Solid method versus Prolonged Curing Times of 120 days, using Mineral 1.

The results of FIG. 7 for the tests of the S-L-S method were obtained from the continuation of the tests of Example 7. For that, a second cycle of Drying and Oversaturation was carried out for a 60-day period. In the case of prolonged curing tests, tests having a curing period of 120 days were continued.

As soon as the second step and the prolonged curing time were completed, the third step of Washing and watering was started for all the tests with a watering rate of 10 L/h/m² for 12 hours, using an artificial raffinate solution containing 180 g/L sodium chloride, 5 g/L ferric chloride, 2 g/L ferrous chloride, and 10 g/L of acid.

The results can be seen in FIG. 7, where the S-L-S method again allowed a much higher extraction than the one achieved with prolonged curing periods. During two cycles of the S-L-S method, an extraction of 72.1% and 74.7% was achieved for bischofite and sodium chloride, respectively. However, for tests with prolonged resting periods only 37.9% and 36.9% were respectively achieved.

Example 9: Copper Extraction in Relation to the First Cycle of the Solid-Liquid-Solid Method, Using a Mixture of Salts and Mineral 1

Figure 8:
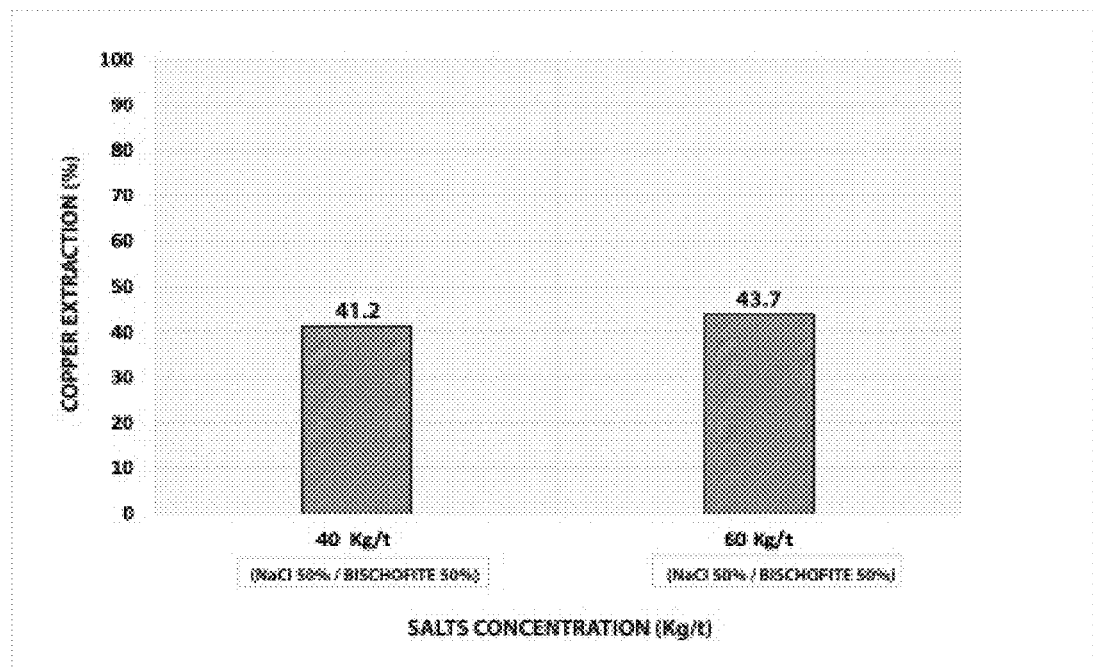
FIG. 8: copper-extraction chart in relation to the first cycle of the Solid-Liquid-Solid method, using a mixture of salts and Mineral 1.

The results of FIG. 8 were obtained in column test using Mineral 1.

Minerals were subjected to a traditional crushing process until achieving a particle size 100% under ½ inch. Subsequently, two charges of said mineral were prepared, and then subjected to the Wetting step, wherein agglomeration and curing were performed by adding water and acid together. The direct addition of bischofite and sodium chloride in solid form on the mineral was performed using the following concentrations and conditions:

a) Addition of 40 kg/t salts (20 kg/t NaCl and 20 kg/t bischofite).
b) Addition of 60 kg/t salts (30 kg/t NaCl and 30 kg/t bischofite).
c) Acid addition: 15 kg/t.
d) 10% Moisture.
e) Drying temperature of from 25-30° C.
f) Drying of 45 days.

As soon as the drying time of the second step was completed, the third step of Washing was started, with a watering rate of 5 L/h/m² for 24 hours, using an artificial raffinate solution containing 180 g/L sodium chloride, 5 g/L ferric chloride, 2 g/L ferrous chloride, and 10 g/L of acid.

The results can be seen in FIG. 8, wherein it is observed that during 45 days of drying extractions similar to the ones obtained using salts separately were achieved. This indicates that a mixture of salts can be used for both 40 and 60 kg/t of salts.

Example 10: Copper Extraction in Relation to the Solid-Liquid-Solid Method Versus Prolonged Curing Times Using 1 m Columns The results of FIG. 9 were obtained in column test using Mineral 1 (see Table 1).

Mineral 1 was subjected to a traditional crushing process until achieving a particle size 100% under ½ inch. Subsequently, four 30-kg charges of said mineral were prepared, and then subjected to the Wetting step, executing the agglomeration and curing process by adding water and acid together for the S-L-S method, whereas water and acid were added separately for the prolonged curing test. The direct addition of bischofite and sodium chloride in solid form on the mineral was performed using the following concentrations and conditions:

Solid-Liquid-Solid Method (Cycle No. 1)
a) Addition of 60 kg/t NaCl.
b) Addition of 40 kg/t bischofite.
c) 10% Moisture.

d) Acid: 15 kg/t.

e) Thermal drying: 25-30° C.

f) Drying time: two cycles of 60 days.

Prolonged Curing Time a) Addition of 60 kg/t NaCl.

b) Addition of 60 kg/t bischofite.

c) 10% Moisture.

d) Acid: 40 kg/t.

e) Room temperature.

f) Curing time: 60 days, and watering for 60 days.

As soon as the first drying time was completed, the step of Washing was started, with a watering rate of 5 L/h/m² for 24 hours, using an artificial raffinate solution containing 200 g/L sodium chloride, 5 g/L ferric chloride, 2 g/L ferrous chloride, and 10 g/L of acid, and 240 g/L bischofite, 5 g/L ferric chloride, 2 g/L ferrous chloride, and 10 g/L of acid.

As soon as the Washing step concluded, a second drying cycle began for 60 days.

In the case of prolonged curing tests, once the 60-day curing was over the watering began with a watering rate of 5 L/h/m² for 24 hours, using an artificial raffinate solution of 150 g/L sodium chloride, 5 g/L ferric chloride, 2 g/L ferrous chloride, and 10 g/L of acid. As soon as the first watering concluded, watering-resting periods took place every 5 days using a rate of 5 L/h/m² for 12 hours until completing 120 days of tests.

Figure 9:
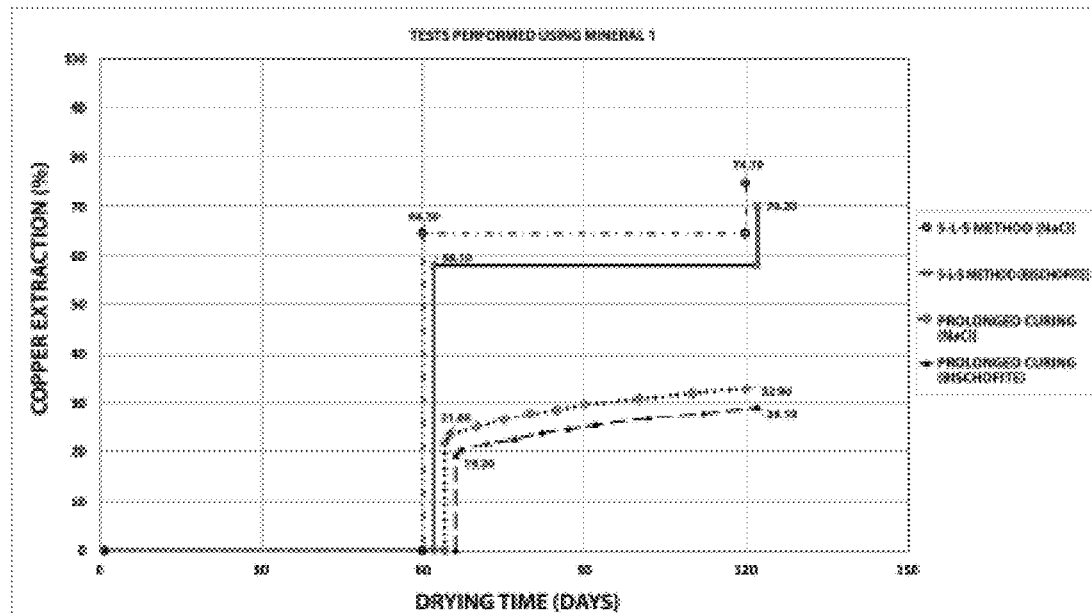
FIG. 9: copper-extraction chart in relation to the Solid-Liquid-Solid method versus Prolonged Curing Times, using 1 m columns.

The results can be seen in FIG. 9, wherein it is observed and confirmed that the S-L-S method is more effective in the extraction from the mineral containing copper in the form of chalcopyrite mainly, even when the tests of the S-L-S method were performed with a lower concentration of Bischofite and acid than the one of the prolonged curing tests. The extraction for the S-L-S method achieved an extraction for both salts greater than 70%; however, it was less than 33% in the case of prolonged curing tests. On the other hand, the results of REDOX potential and chemical analysis of the solutions obtained from the washing of the first cycle of Wetting and Drying are included in this example; further to the effluent from the prolonged curing test (see Table 2).

TABLE 2 chemical analysis of the solutions of the first washing and watering

| CONDITIONS | CuT g/L | FeT g/L | $Fe^{2+}$ g/L | $Fe^{3+}$ g/L | REDOX POTENTIAL Eh |
|---|---|---|---|---|---|
| S-LS METHOD (NaCl) | 19.1 | 3.6 | — | 3.6 | 655 |
| S-L-S METHOD (BISCHOFITE) | 22.9 | 2.3 | 0.5 | 1.8 | 724.9 |
| PROLONGED CURING (NaCl) | 10.1 | 9.6 | 6.1 | 3.5 | 641 |
| PROLONGED CURING (BISCHOFITE) | 10.9 | 9.1 | 5.2 | 3.9 | 711.8 |

As can be seen in Table No. 2, the S-L-S method has a higher concentration of copper in relation to total iron, with a copper and iron ratio of approximately 5:1 for sodium chloride and almost 10:1 for bischofite. On the contrary, the copper/iron ration is 1:1 for both salts approximately in the case of prolonged curing. It can also be observed that redox potentials are similar and no significant differences are detected, which indicate that the potential difference can affect the copper solubilization.

Figure 10:
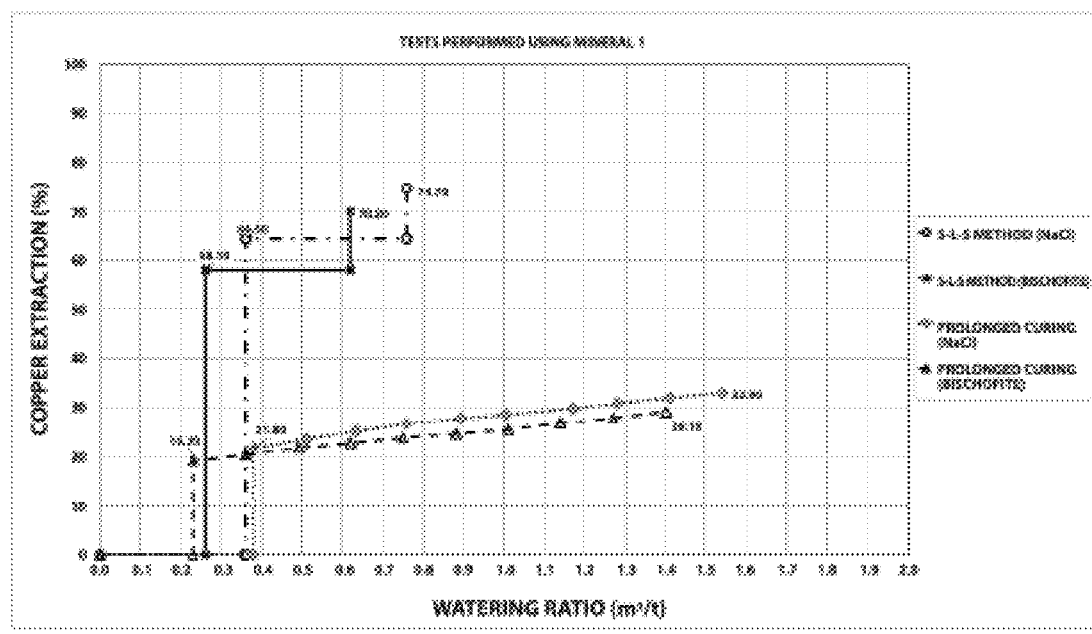
FIG. 10: Watering ratio chart in relation to the Solid-Liquid-Solid method versus Prolonged Curing Times, using 1 m columns.

Example 11: Watering Ratio in Relation to the Solid-Liquid-Solid Method Versus Prolonged Curing Times Using 1 m Columns The results of FIG. 10 for the tests of the S-L-S method were obtained from the tests of Example 10. For this purpose, a chart was prepared to identify the watering ratio of both processes. As can be seen in FIG. 10, the Solid-Liquid-Solid method has a lower watering ratio in comparison to tests with prolonged curing and watering-resting. In addition, it shall be considered that the bischofite tests have a lower watering ratio in both cases, due to their greater deliquescence; accordingly, in each washing step the amount of solution to be used was lowered.

Example 12: Copper Extraction in Relation to the Solid-Liquid-Solid Method Versus Prolonged Curing Times Using Mineral 2

Figure 11:
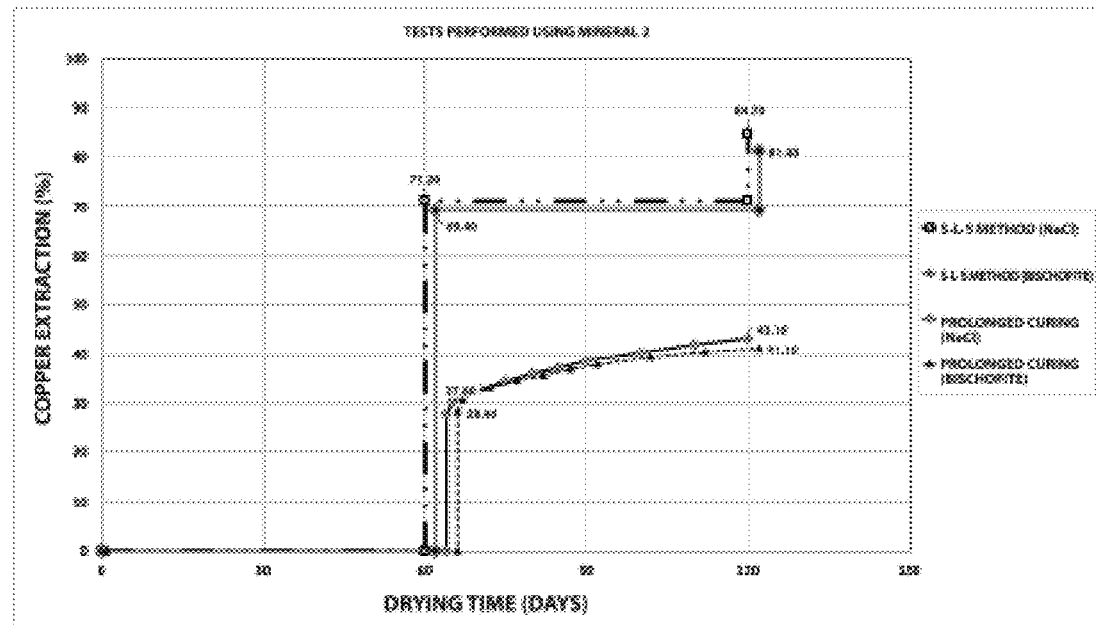
FIG. 11: copper-extraction chart in relation to the Solid-Liquid-Solid method versus Prolonged Curing Times, using Mineral 2.

The results of FIG. 11 were obtained in 1-m column tests using Mineral 2, which has a total copper grade of 0.68% and a chalcopyrite percentage of 81.7% by copper species (see Table 1).

Minerals were subjected to a traditional crushing process until achieving a particle size 100% under ½ inch. Subsequently, four 30-kg charges of said mineral were prepared, and then subjected to the Wetting step, executing the agglomeration and curing process by adding water and acid together for the S-L-S method, whereas water and acid were added separately for the prolonged curing test. The direct addition of bischofite and sodium chloride in solid form on the mineral was performed using the following concentrations and conditions:

Solid-Liquid-Solid Method (Cycle No. 1)

a) Addition of 60 kg/t NaCl.

b) Addition of 40 kg/t bischofite.

c) 10% Moisture.

d) Acid: 15 kg/t.

e) Air injection drying.

f) Drying time: two cycles of 60 days.

Prolonged Curing Time a) Addition of 60 kg/t NaCl.

b) Addition of 40 kg/t bischofite.

c) 10% Moisture.

d) Acid: 40 kg/t.

e) Room temperature.

f) Curing time: 60 days, and watering for 60 days.

As soon as the first drying time was completed, the step of Washing was started, with a watering rate of 5 L/h/m² for 24 hours, using an artificial raffinate solution containing 200 g/L sodium chloride, 5 g/L ferric chloride, 2 g/L ferrous chloride, and 10 g/L of acid, and 240 g/L bischofite, 5 g/L ferric chloride, 2 g/L ferrous chloride, and 10 g/L of acid. As soon as the Washing step concluded, a second drying cycle began for another 60 days. In the case of prolonged curing tests, once the 60-day curing was over the watering began with a watering rate of 5 L/h/m² for 24 hours, using an artificial raffinate solution of 150 g/L sodium chloride, 5 g/L ferric chloride, 2 g/L ferrous chloride, and 10 g/L of acid. As soon as the first watering concluded, watering-resting periods took place every 5 days using a rate of 5 L/h/m² for 12 hours until completing 120 days of tests.

The results can be seen in FIG. 11, where it is observed and confirmed that the SLS method is more effective in the copper extraction from the primary sulfide than the prolonged curing process and subsequent watering-resting, since the extraction for both salts was above 80% and less than 44%, respectively. One can also conclude that the effect of the prolonged curing process is enhanced by mineralogy, since Mineral 2 has only 70% chalcopyrite and the other 30% are less refractory and soluble mineralogical species, as approximately 30% of copper were obtained during the first watering.

Example 13: Copper Extraction in Relation to the Solid-Liquid-Solid (S-L-S) Method Versus Bioleaching and Chlorinated Leaching Using Mineral 3

Figure 12:
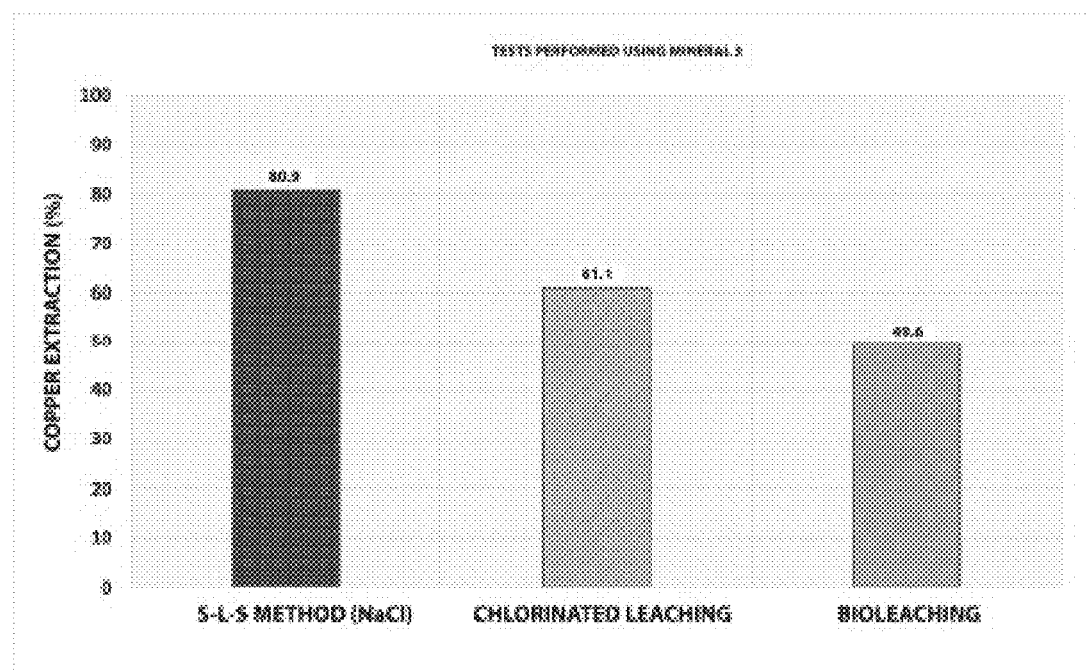
FIG. 12: copper-extraction chart in relation to the solid-liquid-solid (S-L-S) method versus Bioleaching and Chlorinated Leaching, using Mineral 3.

The results of FIG. 12 were obtained in 1-m column tests using Mineral 3, which has a total copper grade of 0.36% and a chalcopyrite percentage of 45% by copper species (see Table 1).

Minerals were subjected to a traditional crushing process until achieving a particle size 100% under ½ inch. Subsequently, 3 charges of said mineral were prepared, and then subjected to the Wetting step, executing the agglomeration and curing process by adding water and acid together for the S-L-S method, whereas water and acid were added separately for the tests of Chlorinated Leaching and Bioleaching. The direct addition of sodium chloride in solid form on the mineral was performed using the following concentrations and conditions:

Solid-Liquid-Solid Method (Cycle No. 1)
a) Addition of 60 kg/t NaCl.
b) 10% Moisture.
c) Acid: 15 kg/t.
d) Thermal drying: 25-30° C.
e) Drying time: 60 days.

The chlorinated leaching and bioleaching tests were performed in 1 m columns by a metallurgical laboratory experienced in this type of tests. The classical methods for leaching secondary sulfides in Mineral 3 were performed. Chlorinated leaching was performed with a concentration of 150 g/L sodium chloride, 30 kg/t acid and 10% moisture. The process lasted 90 days through watering and resting steps.

In the case of bioleaching, the test was carried out with a bacterial consortium composed of oxidizing iron and sulfur microorganisms, 10% moisture and 50 kg/t acid. The process lasted 90 days through watering and resting steps.

The results are shown in FIG. 12, where it is observed that, by using a mixed mineral of primary and secondary sulfides the S-L-S method is more efficient in copper extraction than traditional methods, since it allows the extraction of copper both from chalcopyrite, as from soluble sulfides such as chalcocite, covellite, and malachite.

Example 14: Water Input by the Use of Bischofite in the Wetting Step to Achieve Moisture of 6% and 10%

Figure 13:
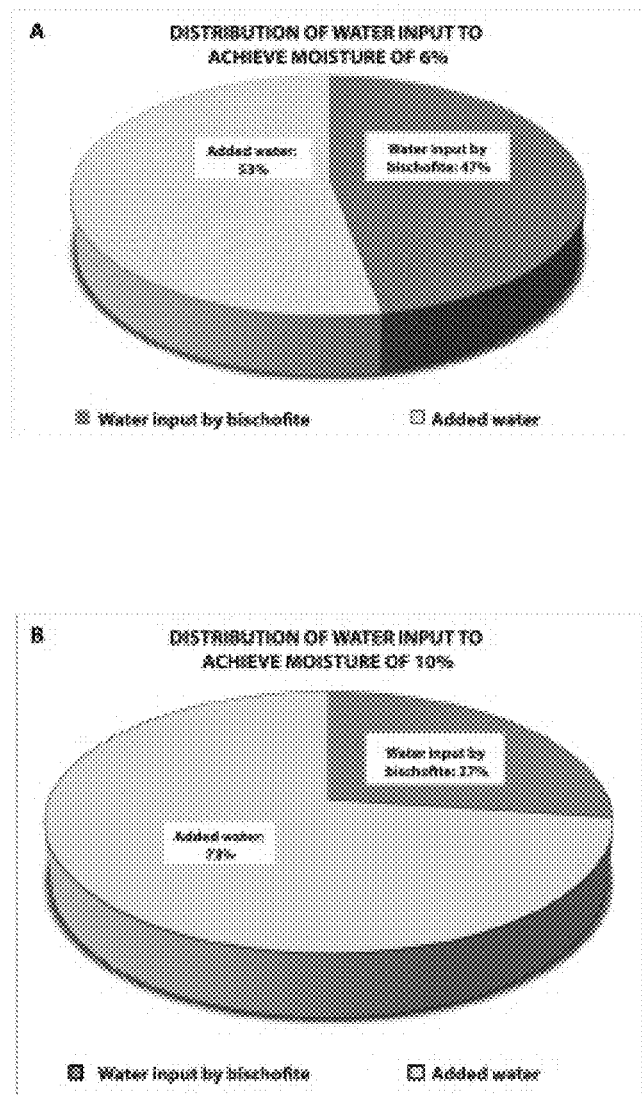
FIG. 13: Graph of water input by the use of bischofite in the wetting step to achieve moisture of 6% and 10%.

The results of FIG. 13 were obtained in column tests described in Example 3 using Mineral 1, which has a total copper grade of 0.24% and a chalcopyrite percentage of 99.8% by copper species (see Table 1).

To plot the obtained data the amount of water provided by the bischofite mass used to wet the mineral and reach a moisture of 6 and 10% was determined.

The results can be seen in FIGS. 13A and 13B, wherein it was determined that for moisture of 6% bischofite provides 47% of the water required for wetting. However, to reach a 10% moisture the water input of bischofite corresponds to 27%.

Example 15: Copper Extraction Using the Solid-Liquid-Solid Method in Mineral 4

Figure 14:
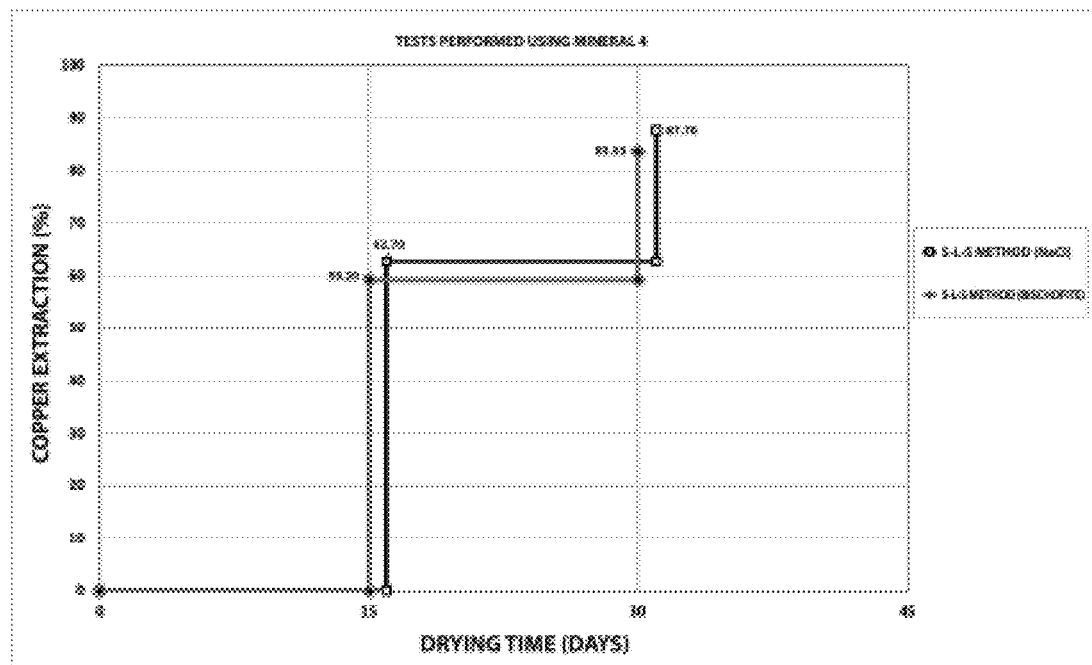
FIG. 14: copper-extraction chart using the Solid-Liquid-Solid method in Mineral 4.

The results of FIG. 14 were obtained from column tests using Mineral 4, which has a total copper grade of 0.67%, a chalcocite percentage of 76.24% and a chalcopyrite percentage of 11.7% by copper species (see Table 1).

Minerals were subjected to a traditional crushing process until achieving a particle size 100% under ½ inch. Subsequently, 2 loads of said mineral were prepared, then the mineral loads were subjected to the S-L-S method, starting with the wetting step, wherein the agglomeration began with the addition of water and acid together, according to the following conditions:

Solid-Liquid-Solid Method (Cycle No. 1)
a) Addition of 40 kg/t NaCl.
b) 10% Moisture.
c) Acid: 15 kg/t.
d) Thermal drying: 25-30° C.
e) Drying time: 15 days.

As soon as the first drying cycle was completed, the step of Washing and re-wetting was started, with a watering rate of 5 L/h/m² for 24 hours, using an artificial raffinate solution containing 200 g/L sodium chloride, 5 g/L ferric chloride, 2 g/L ferrous chloride, and 10 g/L of acid. Then a second drying cycle took place for another 15 days. After the time of the second drying cycle was over, the second washing was carried out with a pH 1 acidulated solution at an irrigation rate of 5 L/h/m² for 24 hours. Finally, the test was concluded.

The extraction results are shown in FIG. 14, which shows that in the first cycle of the Solid-Liquid-Solid method, Mineral 4 is highly solubilized in just 15 days of drying.

However, the extraction of the remaining copper was achieved during the second drying cycle, reaching an extraction greater than 80%.

It is expected that high copper extraction takes place during the test on a mineral having a total copper greater than 70% in the form of chalcocite. However, using the solid-liquid-solid method according to the invention it is possible to extract the maximum copper concentration with only two 15-day cycles.

Example 16: Mineralogy of Concentrate 1

The results of Table 3 were obtained by means of quantitative mineralogical analysis of a representative sample of primary copper concentrates, denominated Conc. 1. 1. For the analysis, optical microscopy was used, supported by sequential-copper chemical analysis. To determine the mineralogical composition the statistical method of point counting was used. Mineralogical analysis indicated that the total copper law for Conc. 1 is 25.57%; however, the analysis by copper species showed that mainly Conc. 1 contains 80.03% chalcopyrite and 12.14% tennantite.

TABLE 3 quantitative mineralogical analysis of a representative sample of primary copper concentrates

| Species | Concentrate 1 % |
|---|---|
| Total copper grade | 25.57 |
| Chalcopyrite | 80.03 |
| Bornite | 5.66 |

TABLE 3-continued quantitative mineralogical analysis of a representative sample of primary copper concentrates

| Species | Concentrate 1 % |
|---|---|
| Tennantite | 12.14 |
| Enargite | 0.53 |
| Chalcocite | 0.11 |
| Covellite | 1.53 |

Example 17: Copper Extraction in a Chalcopyritic Concentrate Using the Solid-Liquid-Solid Method Versus Ferric, Chlorinated Leaching, and Prolonged Curing Time The results of FIG. 15 were obtained using a concentrate rich in chalcopyrite, which had a particle size distribution 100% between 75-106 microns, and a total copper percentage of 25.37% (see Table 3). Subsequently, the masses of concentrates for the tests under 3 types of reaction were weighed, as described below.

A. Solid-Liquid-Solid Reaction (Water and Acid)

To carry out the tests, 200 grams of the concentrate were weighed for each salt, then the sample was subjected to the wetting step, which consisted in the solid addition of 100 kg/t NaCl, 100 kg/t of bischofite and 100 kg/t $FeCl_3 \times 6H_2O$ on the concentrate, then a solution consisting of water and acid (2 g/L ferrous and 3 g/L ferric), achieving a final moisture of 12%.

As soon as the concentrate was wetted, the second step of the process began, wherein the concentrates were stored in a drying chamber at 30° C. for 25 days. Subsequently, the third step of the process began, wherein the concentrate was transferred to the washing tanks, carrying out the process with a pH 1 solution for 30 minutes. As soon as the washing was performed, the concentrate was filtered and subsequently dried to start a second cycle of Wetting and Drying.

B. Solid-Liquid-Solid Reaction (Water)

To carry out the tests, 200 grams of the concentrate were weighed for each salt. Subsequently, the sample was subjected to the wetting step, wherein 100 kg/t NaCl, 100 kg/t bischofite and 100 kg/t $FeCl_3 \times 6H_2O$ were added in solid form over the concentrate. Then—for the sodium chloride test, a solution composed of water with 2 g/L of ferrous and 3 g/L of ferric was added, until achieving a final moisture of 13%. However, the test with bischofite and $FeCl_3 \times 6H_2O$ was performed with the addition of the salt only. As soon as the concentrate was wetted, the second step of the process began, wherein the concentrates were stored in a drying chamber at 30° C. for 25 days. As soon as the drying and oversaturation period concluded, the third step of the process began, wherein the concentrate was transferred to the washing tanks, carrying out the process with a pH 1 solution for 30 minutes. As soon as the washing was performed, the concentrate was filtered and subsequently dried to start a second cycle of Wetting and Drying.

C. Solid-Liquid-Solid Reaction (Ferric Sulfate)

To carry out the tests, 200 grams of the concentrate were weighed, then the sample was subjected to the wetting step, which consisted in the solid addition of 100 kg/t ferric sulfate on the concentrate, then a solution consisting of water and acid (2 g/L ferrous and 3 g/L ferric) was added until achieving a final moisture of 12%. As soon as the concentrate was wetted, the second step of the process began, wherein the concentrates were stored in a drying chamber at 30° C. for 25 days. As soon as the drying and oversaturation period concluded, the third step of the process began, wherein the concentrate was transferred to the washing tanks, carrying out the process with a pH 1 solution for 30 minutes. As soon as the washing was performed, the concentrate was filtered and subsequently dried to start a second cycle of Wetting and Drying.

D. Solid-Liquid Reaction Chlorinated Leaching

To conduct the tests, 50 grams of each concentrate were weighed, then the concentrate was taken to a 1,000 mL Erlenmeyer flask and 500 mL of acidulated solution was added at pH 1, with a concentration of 200 g/L of sodium chloride. Each test was performed in duplicate and placed under agitation at 120 rpm for 45 days at room temperature. On the other hand, during that period there was no pH adjustment and no solution reinstatement, and the solution vanished due to evaporation.

Figure 15:
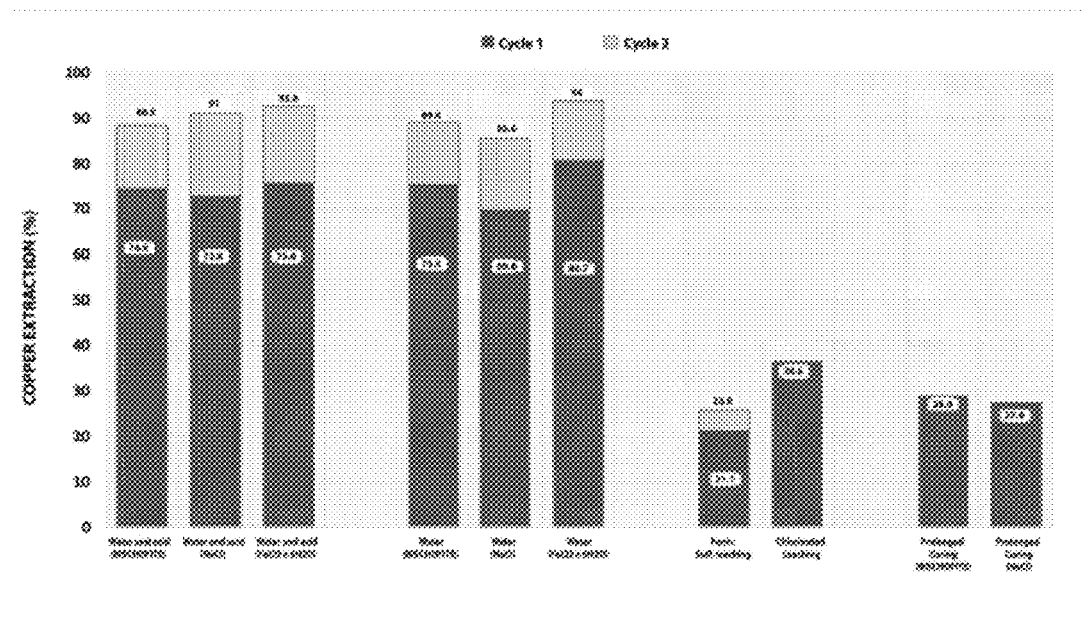
FIG. 15: copper-extraction chart in a chalcopyritic concentrate, using the Solid-Liquid-Solid method versus Ferric, Chlorinated Leaching, and prolonged curing time.

As soon as the time of the test was completed, the solution was filtered and the solid was separated from the liquid, in order to carry out the corresponding chemical analyzes and determine the extraction of copper, as shown in FIG. 15.

E. Prolonged Curing in the Presence of Salts

To conduct the tests, 200 gr of concentrate were weighed for each salt, then the sample was subjected to a curing step, which consisted in adding a pH 0.5 solution that comprised 150 g/L sodium chloride, 2 g/L ferrous, and 3 g/L ferric, and the same condition was used for the test using bischofite, thus achieving a final moisture of 13%.

As soon as the concentrated was cures, it was allowed to stand for 50 days. As soon as the curing period concluded, the washing of the concentrated was conducted, executing the process with a pH 1 solution for 30 minutes. The obtained solutions was analyzed so as to determine the amount of copper obtained.

The extraction results are shown in FIG. 15, wherein one can observe that in the Solid-Liquid-Solid conditions, high extraction is achieved for both salts in just 25 days; on the contrary, the prolonged curing condition did not exceed 30% extraction in 50 days.

However, in the cases of the chlorinated-leaching and ferric-sulfate tests the extraction did not exceed 37% and 26%, respectively.

Table 4 shows the concentration of ions, pH and redox potential of the first washings of the S-L-S and ferric sulfate tests; in the case of the other tests the results of the effluent obtained from the single washes thereof are shown.

TABLE 4 concentration of ions, pH and redox potential of the first washings of the S-L-S tests

| Type of reaction | CuT g/l | FeT g/l | Fe2+ g/l | Fe3+ g/l | pH | Eh mV |
|---|---|---|---|---|---|---|
| S-L-S Method water and acid (Bischofite) | 19.86 | 6.26 | 0.56 | 5.7 | 1.2 | 731.8 |
| S-L-S Method water and acid (NaCl) | 22.17 | 3.36 | 0.85 | 2.5 | 1.0 | 689.0 |
| S-L-S Method water and acid (FeCl3 × H2O) | 29.57 | 16.2 | 13.8 | 2.5 | 1.1 | 613.0 |
| S-L-S Method Water (Bischofite) | 26.24 | 7.58 | 1.97 | 5.6 | 0.7 | 659.8 |
| S-L-S Method Water (NaCl) | 18.63 | 3.30 | 1.13 | 2.2 | 1.2 | 642.3 |
| S-L-S Method Water (FeCl3 × H2O) | 26.24 | 16.85 | 6.45 | 10.36 | 0.9 | 742 |
| Sulf. leaching Ferric | 9.77 | 30.04 | 11.10 | 18.9 | 0.8 | 741.0 |
| Chlorinated Leaching (solid-liquid) | 9.53 | 8.92 | 4.36 | 4.6 | 0.5 | 651.0 |

TABLE 4-continued concentration of ions, pH and redox potential
of the first washings of the S-L-S tests

| Type of reaction | CuT g/l | FeT g/l | Fe2+ g/l | Fe3+ g/l | pH | Eh mV |
|---|---|---|---|---|---|---|
| Prolonged Curing (Bischofite) | 10.92 | 7.62 | 1.06 | 6.6 | 1.6 | 646.9 |
| Prolonged Curing (NaCl) | 11.64 | 8.69 | 1.18 | 7.5 | 1.8 | 697.2 |

In the conducted tests one can observe that the copper and iron ratio is greater for copper in the S-L-S method using sodium chloride and bischofite. However, the copper and iron ratio is similar for chlorinated leaching and prolonged curing tests. In the case of redox potential, there is no trend indicating that above or below 700 mV a greater or lesser extraction of copper was achieved.

Figure 16:
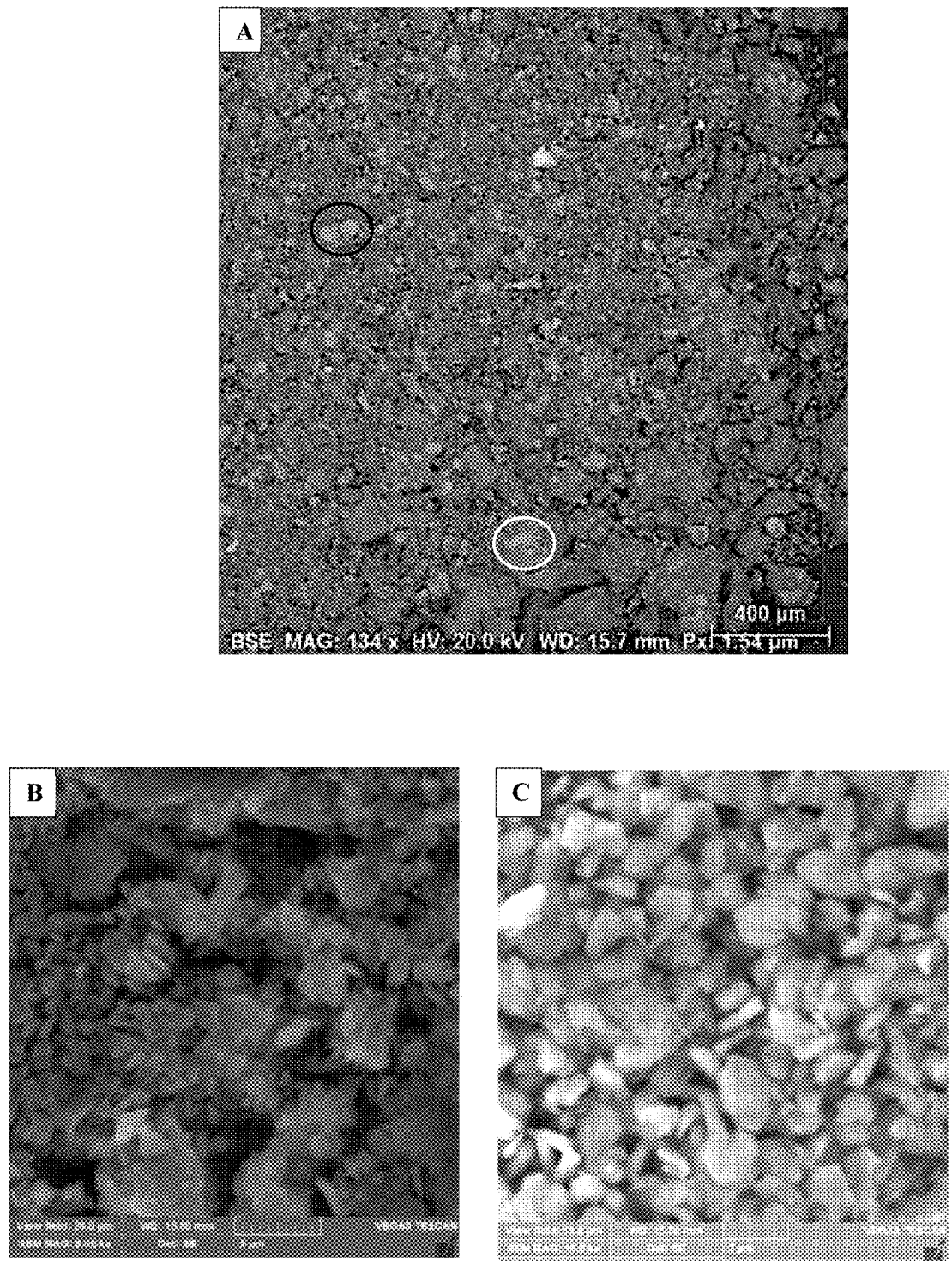
FIG. 16: SEM microscopy images of Concentrate 1, after being subjected to the Wetting and Drying step.

Example 18: Images of SEM Microscopy of Concentrate 1 Subsequent to the Wetting and Drying Step The results of FIG. 16 were obtained from the test with the Solid-Liquid-Solid method in presence of sodium chloride. The test consisted in weighing 200 grams of the concentrate, then the sample was subjected to the Wetting step, which consisted in the solid addition of 100 kg/t NaCl, then a solution consisting of water and acid (2 g/L ferrous and 3 g/L ferric) was added until achieving a final moisture of 12%. As soon as the concentrate was wetted, the second step of the process began, wherein the concentrates were stored in a drying chamber at 30° C. for 25 days. As soon as the drying and oversaturation period concluded, a representative sample of the concentrate was taken to conduct a microscopy analysis, using a scanning electron microscope TES-CAN® Vega-3 model, with EDS Bruker-probe detector—Quantax model, series 400, so as to visualize the crystallization and precipitation processes.

Image A: General image of the concentrate sample, wherein the precipitates, which were generated during the second step of the method, can be identified throughout the sample.

Image B: Specific area of the general image A (white circle), wherein one can see in detail the shape of the precipitates and crystals, which correspond to copper and chlorine complexes having a form defined by the moisture loss during the drying and oversaturation step.

Image C: Specific area of the general image A (black circle), wherein one can see in detail the shape of the precipitates and crystals, which correspond to copper and chlorine complexes having a form defined by the moisture loss during the drying and oversaturation step.

The previous section is considered only illustrative of the principles of the invention. The scope of the claims should not be limited by the exemplary embodiments detailed in the previous section, but they should be provided with the broadest interpretation congruent with the description as a whole.

The invention claimed is:

1. A Solid-Liquid-Solid hydrometallurgical method for solubilization of metals from minerals and/or concentrates of sulfide minerals of primary and/or secondary origin containing them, wherein said method comprises sequential and/or overlapping steps as follows:

I. Wetting, wherein the mineral or concentrate is wetted by joint addition of water and sulfuric acid at a concentration of 10 to 20 kg per ton of material; and sodium chloride at a concentration of 40 to 60 kg per ton of material; wherein a final moisture ranges from 6 to 20%;

II. Drying and Oversaturation, wherein the wetted mineral is dried by vaporization and/or evaporation, by drying cycles ranging from 15 to 90 days, at room temperature of 20 to 40° C. generating oversaturation conditions, crystallization and recrystallization of salts, thus enhancing chemical and physical weathering, and haloclasty on the mineral or concentrate, wherein the heap is covered and protected so as to generate an increase in temperature and maintain the evaporation kinetics; and III. Washing and Re-wetting, wherein an acidulated solution with sodium chloride, wherein the sodium chloride is at a concentration of 120 to 200 g/L and where the pH of the solution is between 0.5 and 6, wherein the acidulated solution is added to remove the metals precipitated in the Drying and Oversaturation step of the process, also allowing to re-wet the mineral or concentrate in order to restore a concentration of chloride and moisture to the bed, wherein if the method is in continuous regime, the mineral or concentrate in step I is contacted with recirculating solutions of the same process that contains chloride, iron and copper ions, in an unsaturated environment, and wherein the three steps are repeated one or more successive times carried out independently of redox potential of the medium.

2. The method according to claim 1, wherein the addition of chloride salts in step I, II, and III includes a mixture of hydrated and/or non-hydrated salts.

3. The method according to claim 1, wherein step I is conducted in an agglomerating drum or on the conveyor belt directly.

4. The method according to claim 1, wherein the oversaturation condition of species and salts in step II is achieved by drying the mineral by air injection and/or temperature increase.

5. The method according to claim 1, wherein the heap is covered or a lid is put thereon during drying cycles in step II.

6. The method according to claim 1, wherein the concentrations of salts to be reinstated in the continuous regime system in step I range of from 5-20 kg/t.

7. The method according to claim 1, wherein after step I, the sulfide mineral is of primary origin, chalcopyrite mainly, is subjected to 2 or 3 drying cycles ranging from 30 to 90 days.

8. The method according to claim 1, wherein after step I, the sulfide mineral is that can be of primary origin, chalcocite or covellite mainly, is subjected to 2 or 3 drying cycles ranging from 15 to 45 days.

9. The method according to claim 1, wherein in step III the mineral is washed through continuous or intermittent watering with a solution containing acidulated water, or acid and chloride.

10. The method according to claim 1, wherein the metals to be solubilized are selected from a group including copper, zinc, nickel, molybdenum, cobalt, lead, among others.

11. The method according to claim 1, wherein step II is applied in a drying chamber or greenhouse that allows generating a constant kinetics of evaporation of the liquid.

12. The method according to claim 1, wherein the metal to be solubilized is copper and the sulfide mineral is a primary and/or secondary mineral of copper.

13. The method according to claim 1, wherein step I of wetting and step II of drying and oversaturation is executed at a pH ranging of from 0.5 to 5.

14. The method according to claim 1, wherein step III of washing is executed with a reused solution in the presence of chloride and iron ions.

15. The method according to claim 1, wherein steps I and II use chloride salts coming from seawater, brines from desalination plants, halite, bischofite and commercial sodium chloride.

16. The method according to claim 1, wherein the solution obtained in step II follows the traditional steps of solvent extraction and electrowinning or electrowinning directly.

17. The method according to claim 1, wherein the Solid-Liquid-Solid method is executed in in-situ leaching.

* * * * *